US012184020B2

(12) United States Patent
Romand et al.

(10) Patent No.: US 12,184,020 B2
(45) Date of Patent: Dec. 31, 2024

(54) ONE-PIECE METAL BLANK FOR JOINING A CONNECTOR TO AN INSULATED CABLE BY CRIMPING, PRE-ASSEMBLED CONNECTOR SUB-ASSEMBLY INCORPORATING THE BLANK OR COMPRISING A CENTRAL CONTACT AND TWO CRIMPING PORTIONS OF DIFFERENT MATERIALS AND/OR THICKNESSES, AND ASSOCIATED METHODS FOR JOINING A CONNECTOR TO A CABLE

(71) Applicant: RAYDIALL, Voiron (FR)

(72) Inventors: Damien Romand, Grenoble (FR); Sebastien Annequin, Saint Nicolas de Macherin (FR)

(73) Assignee: RAYDIALL, Voiron (FR)

( * ) Notice: Subject to any disclaimer, the term of this patent is extended or adjusted under 35 U.S.C. 154(b) by 373 days.

(21) Appl. No.: 17/651,463

(22) Filed: Feb. 17, 2022

(65) Prior Publication Data

US 2022/0263254 A1 Aug. 18, 2022

(30) Foreign Application Priority Data

Feb. 18, 2021 (FR) ....................................... 2101584
Oct. 22, 2021 (FR) ....................................... 2111228

(51) Int. Cl.
*H01R 4/18* (2006.01)
*H01R 43/048* (2006.01)
(Continued)

(52) U.S. Cl.
CPC ......... *H01R 4/185* (2013.01); *H01R 43/0482* (2013.01); *H01R 43/055* (2013.01);
(Continued)

(58) Field of Classification Search
CPC .. H01R 4/185; H01R 43/0485; H01R 43/055; H01R 43/0585; H01R 43/20; H01R 13/6581
(Continued)

(56) References Cited

U.S. PATENT DOCUMENTS 3,163,485 A * 12/1964 Kruitwagen ............. H01R 4/16 29/874
5,603,636 A * 2/1997 Kanou ............... H01R 43/0482 439/585
(Continued)

FOREIGN PATENT DOCUMENTS

CN 101110507 A * 1/2008
CN 105790030 A * 7/2016
(Continued)

OTHER PUBLICATIONS

French Search Report dated Oct. 29, 2021 for corresponding French Application No. 2101584.
(Continued)

*Primary Examiner* — Peter G Leigh
(74) *Attorney, Agent, or Firm* — Pearne & Gordon LLP

(57) ABSTRACT

A first alternative of the application first defines a one-piece metal blank that will make it possible to produce a connector sub-assembly ready to be directly crimped to an insulated and shielded cable, prepared beforehand. A second alternative of the application first defines a pre-assembled connector sub-assembly that incorporates front and rear crimping portions with different electrical and/or mechanical characteristics, and which is ready to be directly crimped to an insulated and shielded cable, prepared beforehand. Either of the two alternatives makes it possible to minimize assembly
(Continued)

steps and associated risks such as those due to the processes of fitting together a great many components according to the prior art.

24 Claims, 25 Drawing Sheets

(51) Int. Cl.
*H01R 43/055* (2006.01)
*H01R 43/058* (2006.01)
*H01R 43/20* (2006.01)
*H01R 13/6581* (2011.01)

(52) U.S. Cl.
CPC ......... *H01R 43/0585* (2013.01); *H01R 43/20* (2013.01); *H01R 13/6581* (2013.01)

(58) Field of Classification Search
USPC ............................ 439/607.01, 585, 399, 394
See application file for complete search history.

(56) References Cited

U.S. PATENT DOCUMENTS

| | | | | | |
|---|---|---|---|---|---|
| 6,142,816 | A * | 11/2000 | Kameyama | H01R 43/048 439/394 |
| 6,848,941 | B2 * | 2/2005 | Wlos | H01R 13/5205 439/585 |
| 7,029,321 | B2 * | 4/2006 | Sato | H01R 24/40 439/516 |
| 7,252,559 | B1 | 8/2007 | Morello et al. | |
| 7,318,742 | B2 * | 1/2008 | Morikawa | H01R 9/0518 174/75 C |
| 7,670,182 | B2 * | 3/2010 | Morikawa | H01R 9/0518 439/620.13 |
| 7,909,645 | B2 * | 3/2011 | Mulfinger | H01R 9/0518 439/578 |
| 8,118,612 | B2 * | 2/2012 | Morikawa | H01R 9/0518 439/578 |
| 8,298,010 | B2 * | 10/2012 | Matsumoto | H01R 9/0518 439/582 |
| 8,834,201 | B2 * | 9/2014 | Miyawaki | H01R 9/0518 439/585 |
| 9,106,040 | B2 * | 8/2015 | Morikawa | H01R 43/048 |
| 9,153,878 | B2 * | 10/2015 | Poma | H01R 4/10 |
| 9,941,607 | B2 * | 4/2018 | Miyazaki | H01R 9/0518 |
| 10,135,203 | B2 * | 11/2018 | Lyu | H01R 24/40 |
| 2005/0266727 | A1 * | 12/2005 | Yamaguchi | H01R 9/0518 439/585 |
| 2010/0035449 | A1 | 2/2010 | Nagafuchi | |
| 2011/0028034 | A1 * | 2/2011 | Morikawa | H01R 9/0518 29/874 |
| 2018/0191088 | A1 * | 7/2018 | Miyazaki | H01R 43/055 |
| 2019/0097366 | A1 | 3/2019 | Surer | |
| 2019/0386439 | A1 * | 12/2019 | Kameyama | H01R 24/42 |

FOREIGN PATENT DOCUMENTS

| | | | | | |
|---|---|---|---|---|---|
| CN | 109921200 | A | | 6/2019 | |
| DE | 30 23 232 | A1 | | 1/1982 | |
| DE | 10004813 | A1 | | 8/2000 | |
| DE | 102017114545 | A1 | * | 1/2018 | H01R 24/38 |
| EP | 2169771 | A1 | * | 3/2010 | H01R 4/185 |
| FR | 2 970 604 | A1 | | 7/2012 | |
| JP | 09-129347 | A | | 5/1997 | |
| JP | 109921200 | A | | 6/2019 | |
| KR | 20100129739 | A | * | 12/2010 | H01R 24/42 |
| TW | 201624853 | A | * | 7/2016 | |
| WO | WO-2009113687 | A1 | * | 9/2009 | H01R 13/6473 |
| WO | 2015/065584 | A1 | | 5/2015 | |

OTHER PUBLICATIONS

Extended European Search Report dated Nov. 11, 2022 for corresponding European Application No. 22156115.2.

* cited by examiner

ONE-PIECE METAL BLANK FOR JOINING A CONNECTOR TO AN INSULATED CABLE BY CRIMPING, PRE-ASSEMBLED CONNECTOR SUB-ASSEMBLY INCORPORATING THE BLANK OR COMPRISING A CENTRAL CONTACT AND TWO CRIMPING PORTIONS OF DIFFERENT MATERIALS AND/OR THICKNESSES, AND ASSOCIATED METHODS FOR JOINING A CONNECTOR TO A CABLE

CROSS-REFERENCE TO RELATED APPLICATION

This application claims the benefit of French Application No. 2101584 filed on Feb. 18, 2021 and French Application No. 2111228 filed on Oct. 22, 2021, the entire disclosures of which are incorporated herein by reference.

TECHNICAL FIELD

The present invention relates to the technical field of electrical connectors.

In particular, the invention aims to improve the joining of a connector to an insulated cable, in particular a power connector to a cable of large cross section for carrying large currents. These may be power connectors that connect, for example, a vehicle's battery to the electric motor or to the power electronics.

These may be connectors carrying other types of signal, such as RF signals, or data.

Although described with reference to a favored application, namely connectors for motor vehicles, and more particularly for hybrid and electric vehicles, the invention may be implemented in any other application.

PRIOR ART

The rapid development of hybrid and electric vehicles demands reliable and easy-to-implement solutions, in particular for making connections between shielded cables and power connectors, either for equipment manufacturers or for the vehicle manufacturers themselves.

A number of connectors have thus been proposed.

Mention may be made here of the two-channel connectors sold by Tyco Electronics Connectivity under the market name "HVP-800 range", Aptiv under the name "RCS800 range" or Rosenberger under the name "HVR200 range".

Every time different components (contacts, shielded cables, connectors) are joined to these existing connectors, it has to be done in multiple successive and ordered steps, with a precise orientation of assembly.

The risk of forgetting a part and/or of making a mistake in the orientation or order of assembly is high and results in those connectors that have been joined to a cable poorly being discarded.

Additionally, with existing connectors, automatic joining is complex or even impossible to implement.

For example, with reference to a two-channel connector from the aforementioned HVP-800 range, joining has to be performed by successively fitting the various components (retaining part, seal, internal and external ferrules, electrical insulator, protective cage for the central contact, electromagnetic shielding ring) of the connector onto a cable, with crimping of an electrically conductive component (contact) at each step in assembly.

Consequently, there is a need to improve the joining of connectors, in particular of power connectors, to a shielded cable, in particular with a view to overcoming the aforementioned drawbacks.

The invention aims to address all or part of this need.

DISCLOSURE OF THE INVENTION

To achieve this, one object of the invention, according to one of the aspects thereof, and according to a first alternative, is a one-piece metal blank for joining a connector to a cable by crimping, comprising:

- a peripheral rim forming a preferably planar support which extends along a longitudinal axis;
- at least two aligned portions, each extending along the longitudinal axis while being separated from one another, each of the two portions being held to the support by at least one strip forming a tie, the front portion being a crimping, clip-fastening, force-fitting-by-catching or overmolding portion, designed to accommodate and to hold by crimping, clip-fastening, force-fitting by catching or overmolding, respectively, an electrical component of the connector, while the rear portion, which is preferably continuous, is a portion for crimping the cable, comprising openings for allowing crimping jaws to pass through.

According to one advantageous embodiment, the front portion is a crimping portion.

According to this embodiment, each of the two crimping portions advantageously comprises an accommodating hollow and at least one crimping wing connected to the hollow, one of the hollows being intended to accommodate the electrical component of the connector.

According to one embodiment, the one-piece blank comprises at least one bearing strip, which is connected to the support and extends inside same between the two crimping portions so as to form a bearing region for an electrical component of the connector accommodated in one of the two crimping portions.

Advantageously, the front crimping portion comprises at least one crimping wing designed to be crimped around the electrical component, preferably around an electrically insulating part housing a pre-assembled central contact.

The rear crimping portion preferably comprises at least one crimping wing designed to be crimped around the shielding braid of the insulated cable.

The rear crimping portion may comprise at least one crimping wing designed to be crimped around the outer and/or inner insulating sheath of the insulated cable or around a seal fitted around the outer sheath of the insulated cable.

Advantageously, the rear crimping portion is continuous.

Each of the two portions is preferably held to the support by at least one tie which extends along the longitudinal axis (X) and/or laterally thereto.

Another subject of the invention, according to another of its aspects, is a connector sub-assembly, comprising:

- an electrical component comprising a pre-assembled central contact, where applicable, housed in an electrically insulating part,
- a one-piece blank as described above, one of the two portions of which accommodates the electrical component.

Advantageously, the electrical component is crimped onto the one-piece blank by the front portion.

The invention also relates to a reel for automatically or semi-automatically joining a connector to a cable by crimping, comprising a plurality of sub-assemblies as above, joined together by an edge of the supports of the blanks and wound around a spool.

The invention also relates to a method for joining at least one connector to a cable, comprising the following steps:

i1/ providing a shielded and insulated cable, the one or more conductive wires and the shielding braid being exposed at one end of the cable;

ii1/ providing a sub-assembly as above, preferably using a reel described above;

iii1/ positioning the cable in the sub-assembly such that the exposed portion of the one or more conductive wires is accommodated in the rear crimping portion of the pre-assembled central contact and that the exposed portion of the shielding braid is accommodated in the crimping portion of the sub-assembly which is separated from the central contact;

iv1/ crimping, by means of a jaw-anvil crimping tool (M), inserted into the openings between the support and the one or more ties and bearing strips, of the rear crimping portion of the pre-assembled central contact onto the one or more conductive wires and, preferably simultaneously, of the crimping portion of the sub-assembly onto the shielding braid;

v1/ cutting the one or more ties, so as to obtain a unitary contact pre-assembled with the cable.

According to one advantageous variant, step i1/ preferably further comprises the provision of a seal fitted around the outer or inner sheath of the cable, step iv/ further comprising the crimping of the rear portion of the sub-assembly, preferably simultaneously with the crimping thereof onto the shielding braid, onto the seal.

Preferably, step v1/ is mechanical cutting using a blade or mechanical cutting by shearing or laser cutting.

According to the advantageous embodiment, the method comprises, after cutting step v/, the following step:

vi1/ fitting the central contact crimped around the one or more conductive wires into the electrically insulating part (3), thereby joining them together definitively.

According to another advantageous embodiment, the method comprises, after step vi1/, when the seal is fitted around the outer sheath of the cable, the following steps:

vii1/ mounting, by snap-fitting, at least one shielding envelope that surrounds both the electrically insulating part and the front portion, so as to obtain a shielded unitary contact;

viii1/ fitting at least one cable-connected unitary contact, shielded according to step vii1/, into a one-piece connector housing, preferably with the unitary contact being held by retaining clamps at the rear of the connector.

According to yet another advantageous embodiment, the method comprises, after step vi1/, when the seal is fitted around the inner sheath of the cable and preferably around the braid of the cable, the following steps:

vii'1/ mounting at least one shielding envelope that surrounds the crimped rear portion, and a shielding envelope that surrounds both the electrically insulating part and the front portion, so as to obtain a shielded unitary contact;

viii'1/ mounting two interface housing half-shells around the one or more unitary contacts shielded according to step vii"1/, preferably with the unitary contact being held by retaining clamps at the rear of the connector.

According to another advantageous embodiment, the method comprises, after step vi1/, when the seal is fitted around the inner sheath of the cable, the following steps:

vii"1/ mounting two shielding half-shells, covering the unitary contacts;

viii"1/ mounting two interface housing half-shells around the two shielding half-shells according to step vii"1/.

Another subject of the invention is a cable-connected unitary contact, where applicable shielded, obtained using the method described above.

Lastly, another subject of the invention is a connector, in particular a multichannel connector, obtained using the method described above.

Thus, the invention according to this first alternative first consists in defining a one-piece metal blank that will make it possible to produce a connector sub-assembly ready to be directly crimped to an insulated and shielded cable, prepared beforehand, which makes it possible to minimize assembly steps and associated risks such as those due to the processes of fitting together a great many components according to the prior art.

Another subject of the invention, according to a second alternative of the invention, is a pre-assembled sub-assembly, which is electrically conductive and extends along a longitudinal axis (X), to be joined by crimping to a cable comprising an electrically conductive core and at least one electrically insulating sheath, and, where applicable, a shielding braid around the core, the sub-assembly comprising a central contact and comprising at least two, electrically conductive, crimping portions, in the axial continuation of the cylindrical body, the portion of which closest to the body, called the front portion, is designed to be crimped around the core of the cable, while the portion of which furthest from the body, called the rear portion, is designed to be crimped around the insulating sheath and/or, where applicable, around the shielding braid, the front and rear crimping portions being of different constituent materials and/or thicknesses.

According to one embodiment, the front and rear crimping portions are of different constituent materials and joined by an electrically conductive or insulating joint. The nature of the materials may thus be different depending on the portion of a cable to be crimped: since the core is directly subjected to the flow of the current, in particular a power current, the front crimping portion may be made of a material with high conductivity, whereas, since the metal braid is only there for providing electromagnetic shielding, the rear crimping portion may be made of a material of lower conductivity. It is also possible to envisage an electrically insulating rear portion.

In other words, it is possible to produce a rear crimping portion of lesser thickness and/or conductivity for smaller currents and for crimping over a larger diameter, it is possible to adjust its mechanical characteristics as desired. It is therefore possible to select the materials or thicknesses according to their mechanical and electrical properties for each crimping portion independently and thereby reduce costs.

Preferably, the joint is formed by riveting, clinching, brazing, welding or bonding.

Advantageously, the rear crimping portion is continuous.

According to one advantageous embodiment, each of the two crimping portions comprises at least one accommodating hollow and at least one crimping wing connected to the hollow, the hollow of the front crimping portion being intended to accommodate the core of the cable while the hollow of the rear crimping portion is intended to accommodate the insulating sheath and/or the braid of the cable.

According to one advantageous variant, the rear crimping portion comprises at least one crimping wing designed to be crimped around the outer and/or inner insulating sheath of the insulated cable or around a seal fitted around the outer sheath of the insulated cable.

According to this variant, the rear crimping portion advantageously comprises at least one crimping wing designed to be crimped around the shielding braid of the cable.

Preferably, the pre-assembled central contact comprises an electrically insulating part in which the electrically conductive body is housed.

The invention also relates to a reel for automatically or semi-automatically joining a connector to a cable by crimping, comprising a plurality of sub-assemblies according to the second alternative of the invention as above, which are mechanically linked to one another by at least one carrier strip and wound around a spool.

Advantageously, the carrier strip is mechanically linked to or integral with the front or rear crimping portion or, where applicable, linked to the joint between the front and rear portions. Further advantageously, the carrier strip is pierced with a plurality of guide holes for guiding the carrier strip as the reel is unreeled.

The invention also relates to a method for joining at least one connector to a cable, comprising the following steps:

i2/ providing a shielded and insulated cable, the one or more conductive wires and the shielding braid being exposed at one end of the cable;

ii2/ providing a sub-assembly as above, preferably using a reel described above;

iii2/ positioning the cable in the pre-assembled sub-assembly such that the exposed portion of the one or more conductive wires is accommodated in the front crimping portion of the pre-assembled central contact and that the exposed portion of the shielding braid is accommodated in the rear crimping portion of the sub-assembly;

iv2/ crimping the front crimping portion of the pre-assembled central contact onto the one or more conductive wires and, preferably simultaneously, the rear crimping portion of the pre-assembled central contact onto the shielding braid, so as to obtain a unitary contact pre-assembled with the cable.

Advantageously, the method comprises, when step ii2/ is performed using the reel, a step iii'2/ of cutting the carrier strip, where applicable simultaneously with step iii2/ of positioning the cable, Step iii'2/ is preferably mechanical cutting of the carrier strip using a blade or mechanical cutting by shearing or by means of laser cutting.

According to one variant, step iv2/ is carried out with at least part of the pre-assembled sub-assembly placed on a crimping support.

According to one advantageous variant, step i2/ further comprises the provision of a seal fitted around the outer or inner sheath of the cable, step iv2/ further comprising the crimping of the rear portion of the sub-assembly, preferably simultaneously with the crimping thereof onto the shielding braid, onto the seal.

Another subject of the invention is a cable-connected unitary contact, where applicable shielded, obtained using the method described above.

Thus, the invention according to the second alternative first consists in defining a pre-assembled connector sub-assembly that incorporates front and rear crimping portions with different electrical and/or mechanical characteristics, and which is ready to be directly crimped to an insulated and shielded cable, prepared beforehand, which makes it possible to minimize assembly steps and associated risks such as those due to the processes of fitting together a great many components according to the prior art.

The advantages of the invention according to both the first and the second alternatives are numerous with respect to the prior art, among which may be mentioned:

- the manufacture of a connector sub-assembly, preferably within a continuous reel, that is ready to be joined by crimping to a cable in a single step compatible with the use of robust crimping tools (jaws that are oversized with respect to the prior art);
- assembly that allows the straightforward integration of a sealing function per unitary assembly within a single-channel connector or per multichannel connector;
- assembly that allows the possibility of modularity in electromagnetic shielding functions at the level of a unitary contact or at the level of a multichannel connector of the contact;
- assembly that is easy to implement automatically.

In addition, with respect to the first alternative, the advantages of the solution according to the second alternative of the invention are the saving of space and the possibility of using less metal material when assembling in a continuous process, by implementing just a carrier strip, and by virtue of a smaller spacing between two successive pre-assembled sub-assemblies, and therefore lower cost.

The applications envisaged for the invention are numerous, among which may be mentioned the power electrical connections in hybrid or electric motor vehicles. More generally, the invention may be adapted for different applications and cable diameters (from 6 kW to around 300 kW).

Other advantages and features of the invention will become more clearly apparent from reading the detailed description of exemplary implementations of the invention, given by way of non-limiting illustration with reference to the following figures.

BRIEF DESCRIPTION OF THE DRAWINGS

FIGS. 2A, 2B, 2C, 2D, 2E, 2F are perspective views showing the various steps in the joining of a pre-assembled connector sub-assembly according to the first alternative of the invention to a shielded and insulated cable prepared according to FIGS. 5A to 5C, in order to obtain a shielded and cable-connected unitary contact.

Figure 1:
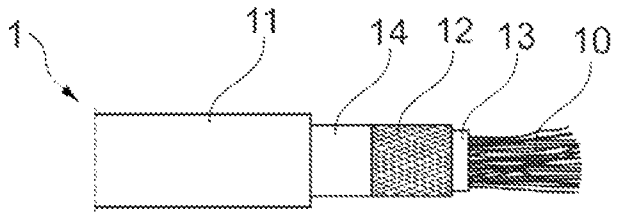
FIG. 1 shows one example of a shielded and insulated cable used in electric vehicles.

Throughout the present application, the terms “vertical”, “lower”, “upper”, “bottom”, “top”, “below” and “above” should be understood by way of reference with respect to a one-piece blank, a connector sub-assembly and an electrical connector according to the invention in horizontally arranged configuration.

Likewise, the terms “front” and “rear” should be understood with respect to the connecting face of an electrical connector according to the invention. Thus, the front crimping portion of a one-piece blank is that intended to be crimped at the front of a connector while the rear portion is that intended to be crimped at the rear of the connector where the shielded cable is positioned.

For the sake of clarity, one same reference numeral is used for any element that is the same in the first and second alternatives of the invention.

FIG. 1 shows one example of a shielded and insulated power cable, denoted overall by the reference numeral 1, intended to be joined to a connector sub-assembly according to the invention.

The cable 1 comprises one or more electrical conductors 10, of large cross section and insulated from the outside by an outer sheath 11 made of electrically insulating material.

The cable 1 also comprises a metal braid 12 for electromagnetic shielding surrounding the one or more conductors 10 and insulated therefrom by an inner sheath 13 made of electrically insulating material.

Where applicable, the cable 1 may comprise a ribbon made of metal or of a metal/plastic composite material 14, the advantage of which is excellent electromagnetic coverage, typically of the order of 100%.

The various steps in the assembly of a pre-assembled connector sub-assembly according to a first alternative of the invention will now be described with reference to FIGS. 2A to 2F.

Figure 2A:
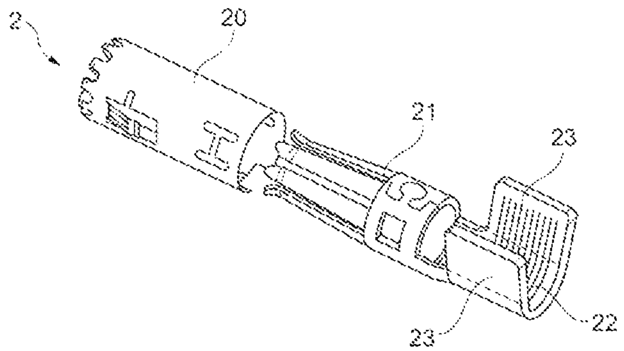
FIGS. 2A, 2B, 2C, 2D, 2E, 2F are perspective views showing different steps in the assembly of a pre-assembled connector sub-assembly according to a first alternative of the invention incorporating a one-piece blank.
Figure 2B:
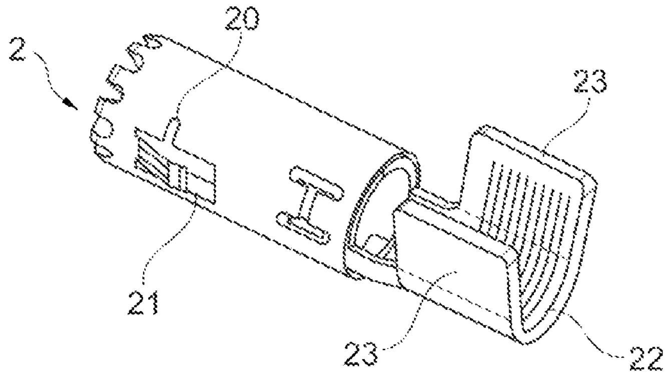

Step 1/: A central contact 2 is pre-assembled. To do this, a portion forming a petalled sleeve 21, made of electrically conductive material, is fitted into and crimped to an electrically conductive cylindrical body 20 (FIGS. 2A, 2B). The crimping operation may be replaced with a snap-fitting operation. The sleeve 21 is extended at the rear by a crimping portion that takes the overall shape of a U comprising an accommodating hollow 22 and two crimping wings 23 that are connected to the hollow 22, and are preferably symmetrical on each side of the hollow.

Figure 2C:
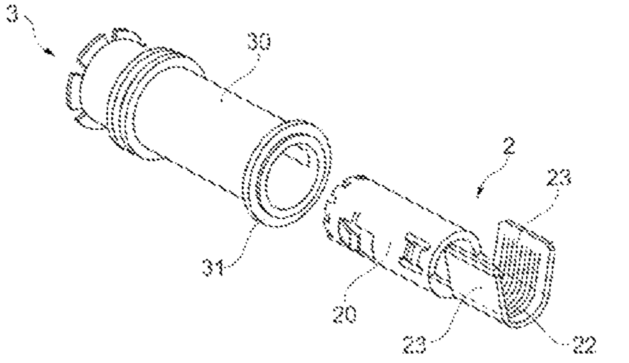
Figure 2D:
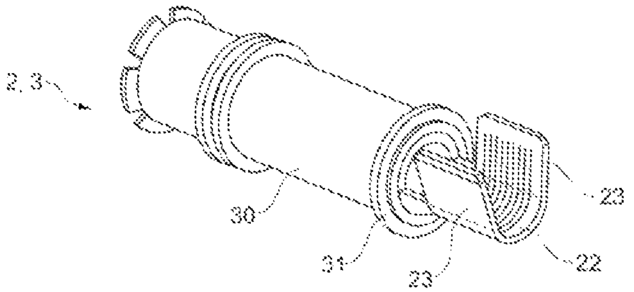

Step 2/: The pre-assembled central contact 2 is then fitted into and secured to an electrically insulating part 3. More precisely, this assembly is carried out so that the cylindrical body 20 is completely housed and secured inside an electrically insulating cylindrical body 30 and the crimping portion 22, 23 which protrudes from the rear of the insulating body 30 is delimited by a cylindrical bearing segment 31, as described in detail hereinafter (FIGS. 2C, 2D).

Figure 2E:
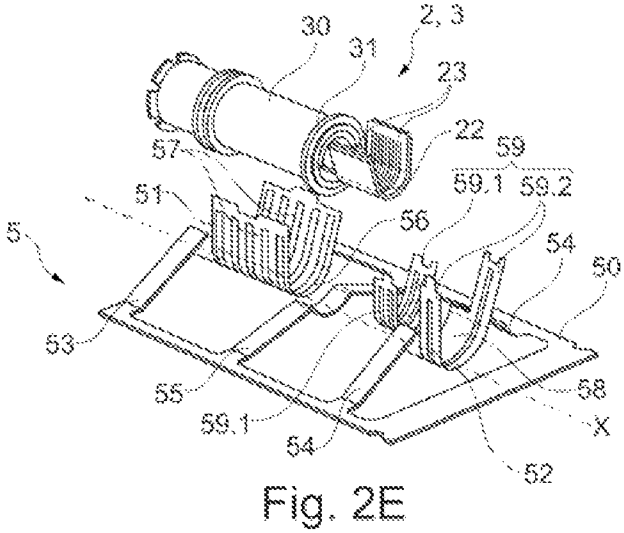

Step 3/: A metal one-piece blank 5 is provided for assembly by crimping (FIG. 2E). Assembly may also be performed using a force-fitting, clip-fastening or overmolding technique, as described in detail hereinafter. This metal blank is produced by means of a die-cutting technique, preferably rolled off a continuous strip.

This one-piece blank 5 first comprises a peripheral rim 50 forming an openwork support which extends along a longitudinal axis X and which, in the example illustrated, takes the overall shape of a rectangle.

Two, respectively front and rear, crimping portions 51, 52 each extend along the longitudinal axis X while being separated from one another, and are held to the support 50 by at least one strip 53, 54 forming a tie. These ties may also be located along the longitudinal axis X. In the example illustrated, two lateral ties 53, 54 are provided which extend from either side of each of the crimping portions 51, 52. The function of these lateral ties 53, 54 is to hold the crimping portions 51, 52 once the connector sub-assembly has been produced.

The front crimping portion 51 comprising an accommodating hollow 56 and at least one crimping wing 57 connected to the hollow 56 and designed to accommodate and to be crimped around the electrically insulating part 3 housing the pre-assembled central contact 2. In the example illustrated, two crimping wings 57 connected to the hollow 56 are provided, preferably facing one another on either side of the hollow 56.

The rear crimping portion 52 comprising an accommodating hollow 58 and at least one crimping wing 59 connected to the hollow 58 and designed to be crimped around the shielding braid 12 of the insulated cable 1. The rear crimping portion also comprises at least one crimping wing 59.2 designed to be crimped around a seal 7. In the event that no sealing is required, the seal is not needed and the crimping wing is directly crimped around the outer sheath of the cable.

In the example illustrated, two pairs of crimping wings 59.1, 59.2 connected to the hollow 58 are provided, preferably facing one another on either side of the hollow 58.

Preferably, the rear crimping portion 52 is continuous in order to ensure the electrical ground continuity.

The one-piece blank 5 further comprises a bearing strip 55, which is connected to the support 50 and extends inside same between the two crimping portions 51, 52 so as to form a bearing region for the electrically insulating part 3.

In the example illustrated, the bearing strip 55 is continuous from one longitudinal edge of the support 50 to the other. The central segment of the bearing strip 55 is shaped into a segment of a cylinder complementary to the bearing segment 31. It may take the form of a strip where one end thereof is connected to a longitudinal edge of the support 50 and the free end thereof serves to support the segment 31 of the electrical insulator 3.

The arrangement of the front and rear crimping portions 51, 52 of the different ties 53, 54 and of the bearing strip 55 relative to the preferably planar support 50 defines empty spaces (V) or openings between and around the crimping portions. These empty spaces (V) allow crimping jaws to pass through, specifically crimping jaws that are sized so as to be robust and therefore to crimp cables 1 of large cross section, in particular power cables.

Step 4/: The electrical insulator 3 is positioned in the front crimping portion 51 of the blank 5 (FIG. 2E). More precisely, it is positioned so that the body 30 of the insulator 3 fits snugly in the crimping hollow 56 and the cylindrical segment 31 bears against the bearing strip 55.

Figure 2F:
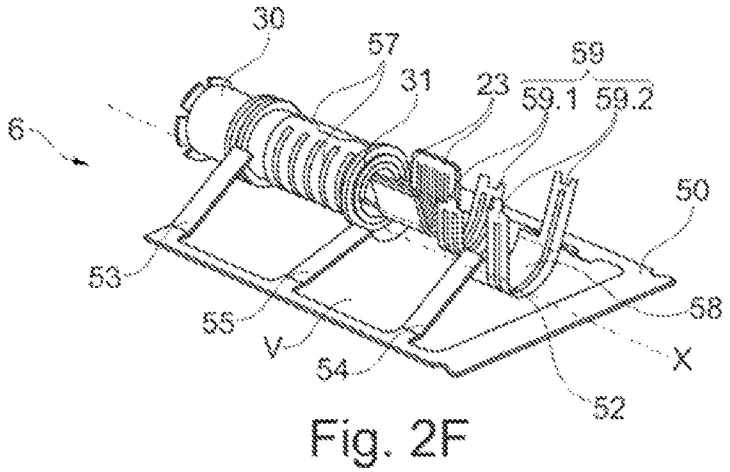

The crimping wings 57 are then folded around the cylindrical body 30. The electrical insulator 3 is then crimped within the one-piece blank 5, which forms a connector sub-assembly 6 intended to be joined by crimping to a cable 1 (FIG. 2F).

Figure 3:
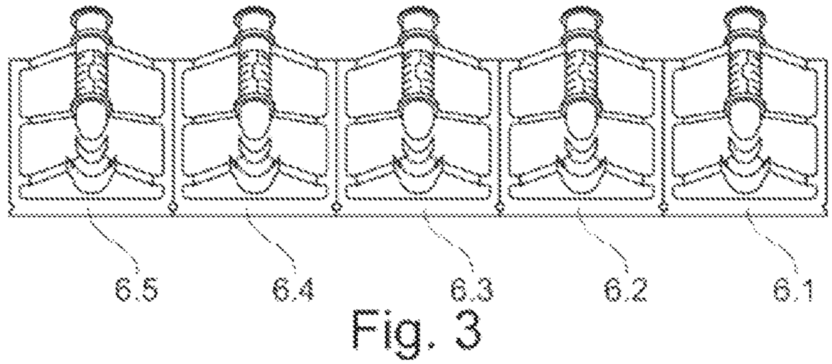
FIG. 3 is a perspective view of a plurality of contiguous connector sub-assemblies obtained according to FIGS. 2A to 2F, ready to be joined to a shielded and insulated cable.

To facilitate automation and assembly in a continuous process, it is possible to produce a continuous strip of a plurality of unitary sub-assemblies 6.1 to 6.5 which are joined together by one of the longitudinal edges of their supports 50 (FIG. 3).

Figure 4:
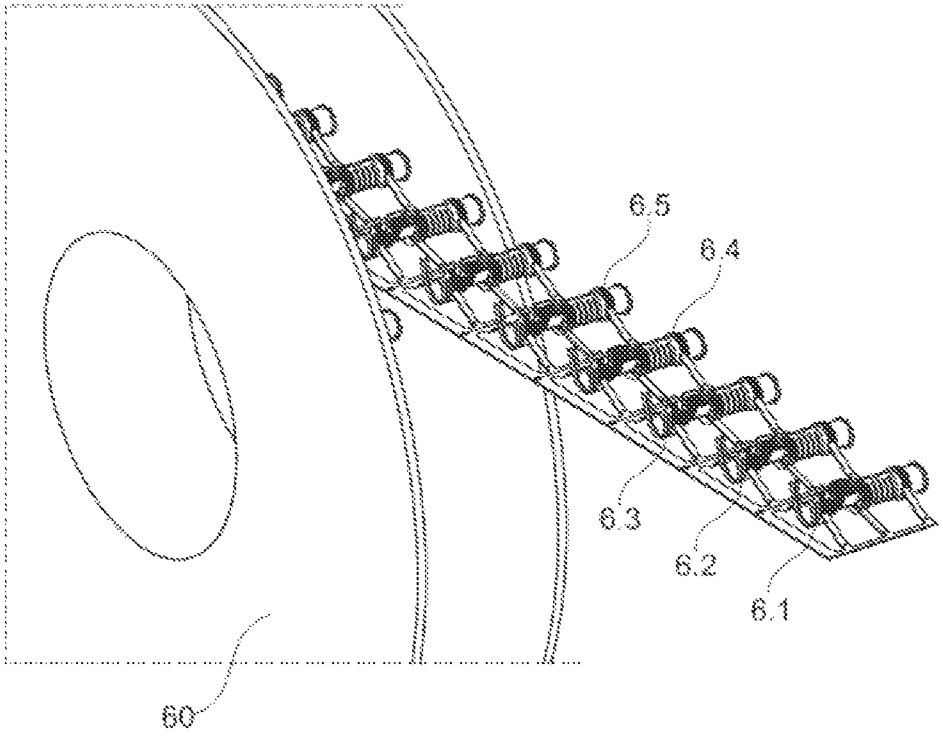
FIG. 4 is a perspective view showing one example of a reel forming an assembly kit ready to be used on an assembly line for joining to a cable with sub-assemblies according to the first alternative.

To further optimize assembly, for compactness, to facilitate storage and transport, the continuous strip may take the form of a continuous reel 60 wound around a spool (FIG. 4). This reel 60 may be entirely produced in an independent assembly unit with respect to an assembly unit for joining to a cable 1.

Figure 5A:
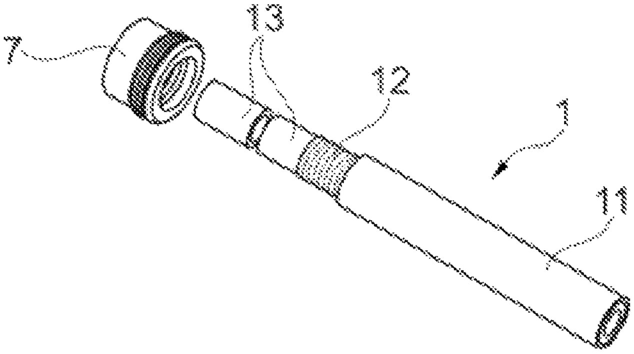
FIGS. 5A, 5B, 5C are perspective views showing the various steps in the preparation of a shielded and insulated cable before it is joined by crimping to a pre-assembled connector sub-assembly according to a first alternative of the invention.
Figure 5B:
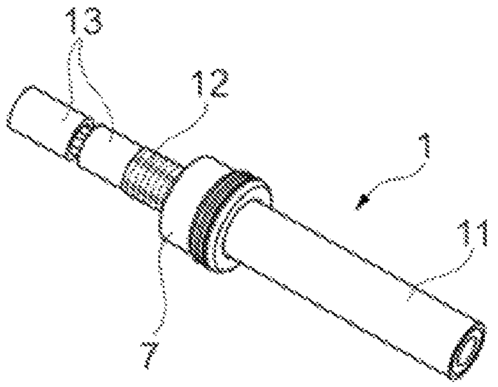
Figure 5C:
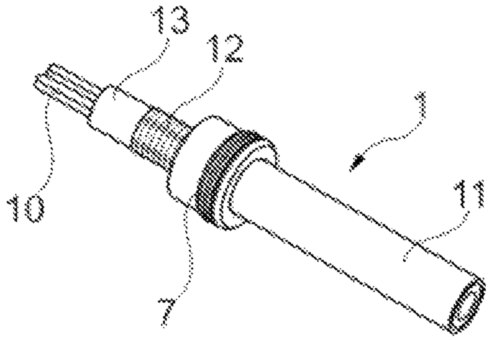

The various steps in preparing a shielded and insulated cable 1 according to the invention will now be described with reference to FIGS. 5A to 5C.

Step 1/: The outer sheath 11 and the inner sheath 13 are pre-stripped to reveal the one or more conductors 10 and the metal braid 12, respectively, over a predetermined length (FIG. 5A).

Step 2/: A seal 7 is fitted around the outer sheath 11 of the cable 1 (FIG. 5B). According to one variant, this step 2/ may take place before step 1/ in order to avoid any potential damage to the metal braid.

Step 3/: The stripped portion of the inner sheath 13 of the cable 1 is removed (FIG. 5C). The various steps in the joining of a pre-assembled connector sub-assembly 6 according to the first alternative to an insulated and shielded cable in order to obtain a cable-connected unitary contact 9 will now be described with reference to FIGS. 6A to 6F.

Step i1/: A cable 1 prepared according to FIGS. 5A to 5C is provided.

Step ii1/: A sub-assembly 6 cut from the reel 60 is provided.

Figure 6A:
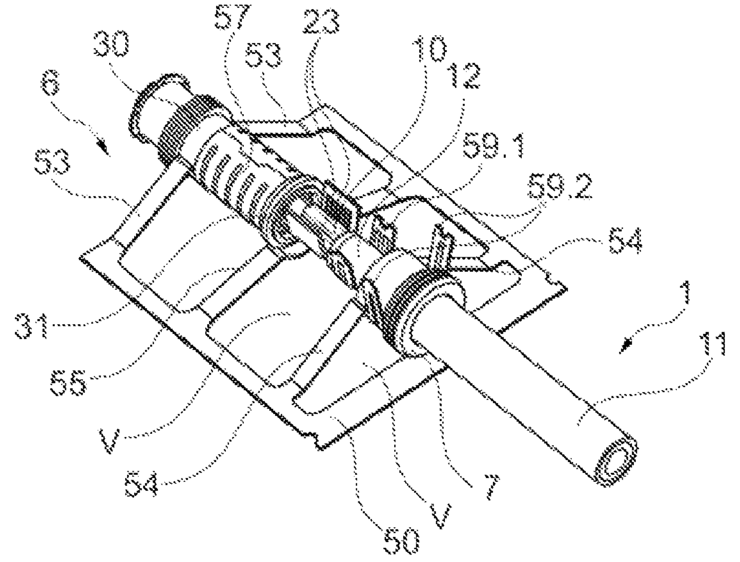

Step iii1/: The cable 1 is positioned in the sub-assembly 6 such that the exposed portion 10 of the one or more conductive wires 1 is accommodated in the crimping portion 22, 23 of the pre-assembled central contact 2 and that the exposed portion of the shielding braid 12 and the seal 7 are accommodated in the hollow 58 of the rear crimping portion 52 of the sub-assembly 6 (FIG. 6A).

Figure 6B:
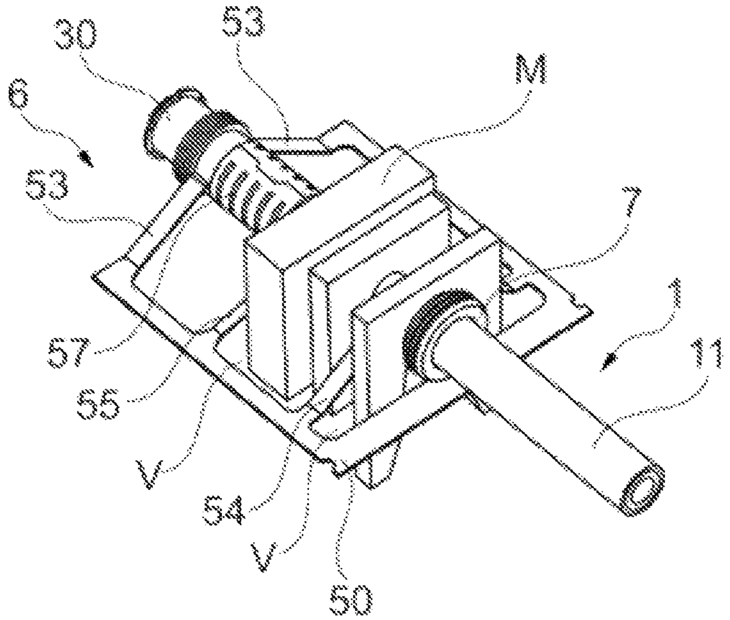

Step iv1/: Simultaneously, by means of a jaw-anvil crimping tool (M), inserted into the openings or empty spaces (V) between the support 50 and the one or more ties 53, 54 and the one or more bearing strips 55, the crimping portion 22, 23 of the pre-assembled central contact is crimped onto the one or more conductive wires 10 and the rear crimping portion 52 of the sub-assembly is crimped onto the shielding braid 12 and onto the seal 7 (FIG. 6B). Thus, the robust jaws M simultaneously fold the pair of crimping wings 23 around the one or more conductors 10 and each of the two pairs of crimping wings 59.1 and 59.2 around the metal shielding braid 12 and the seal 7, respectively.

Figure 6C:
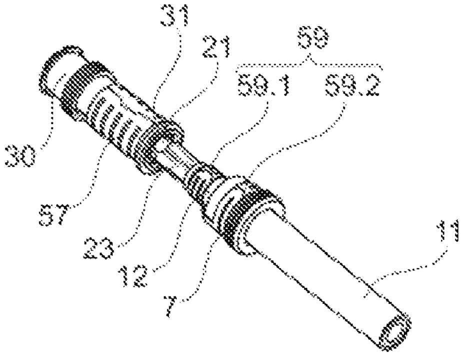

Step v1/: The ties 53, 54 are cut either mechanically, using a blade, or by means of laser (FIG. 6C).

Figure 6D:
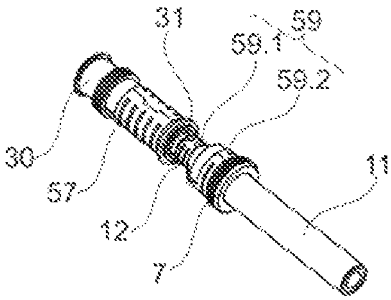

Step vi1/: The central contact 2 crimped around the one or more conductive wires 10 is then fitted into the insulating part 3, joining them together definitively by snap-fitting (FIG. 6D).

Figure 6E:
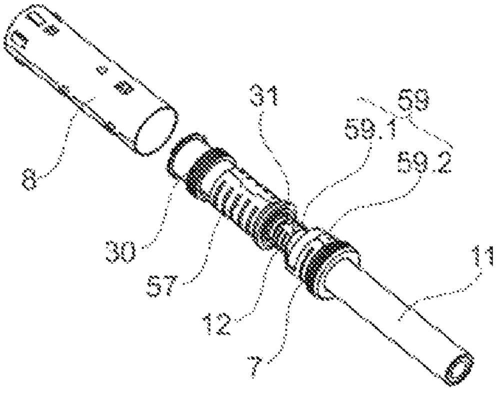
Figure 6F:
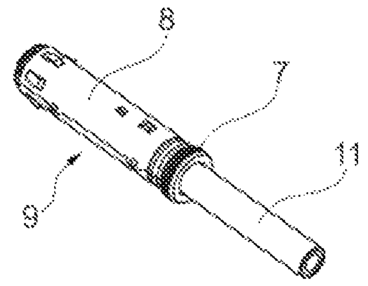

Step vii1/: A shielding envelope 8 is positioned and snap-fitted around both the electrically insulating part and the crimped front portion 51, so as to obtain a shielded unitary contact 9 (FIGS. 6E and 6F).

It is snap-fitted such that the rear of the shielding envelope 8 abuts against the front of the seal 7. Lastly, the envelope 8 is crimped at the level of the crimping of the wings 59.2 and of the hollow for the seal 7, thereby ensuring electrical continuity between the shielding braid of the cable, the hollow 58 of the support and the shielding envelope 8. Effective shielding is then ensured.

The assembly of a two-channel connector 100 on the basis of two unitary connectors 9.1, 9.2 obtained from step vii1/ will now be described with reference to FIGS. 7A to 7D.

Figure 7A:
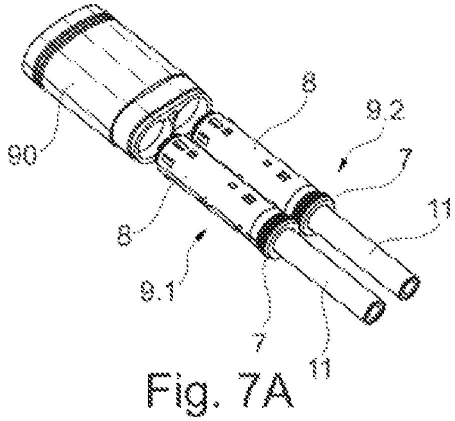
FIGS. 7A, 7B, 7C, 7D are perspective views showing the various steps in a method for assembling a two-channel connector incorporating two shielded and cable-connected unitary contacts according to FIG. 6F.
Figure 7B:
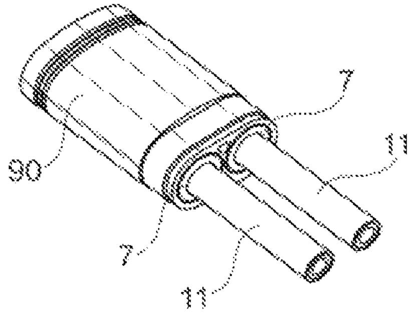

Step viii1/: the two unitary connectors 9.1, 9.2 are inserted into a one-piece connector housing 90 until their fronts come into abutment inside the housing (FIGS. 7A, 7B). The contacts are snap-fitted into the housing 90.

Figure 7C:
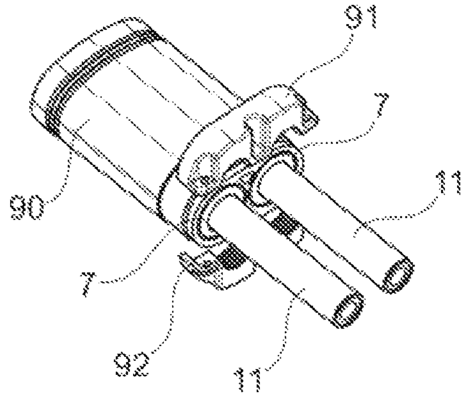
Figure 7D:
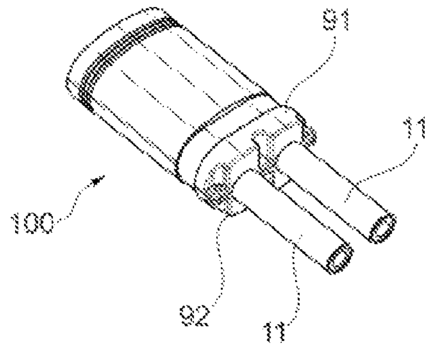

Step ix1/: The forces on the cable are absorbed and the two unitary contacts 9.1, 9.2 are protected by attaching two retaining clamps 91, 92 at the rear of the connector housing 90 (FIGS. 7C, 7D).

Figure 8:
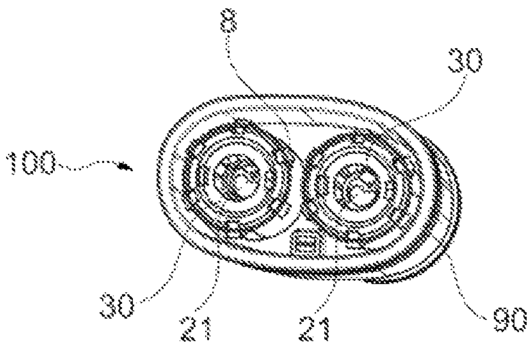
FIG. 8 is a perspective view showing the two-channel connector obtained upon completion of the step of FIG. 7D.
Figure 9A:
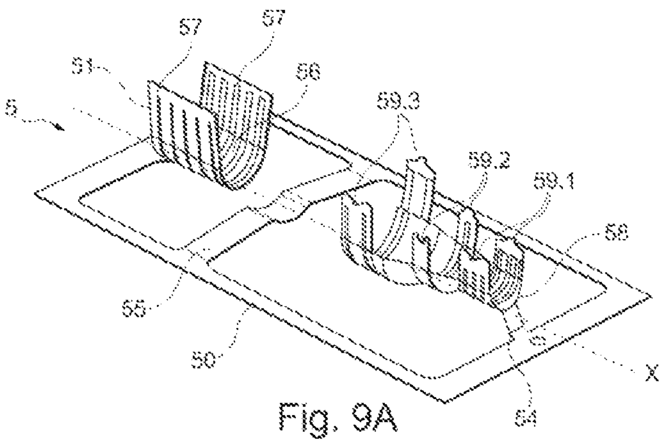
FIGS. 9A and 9B are perspective views of a first variant embodiment of a one-piece blank for assembly by crimping according to the first alternative of the invention.
Figure 9B:
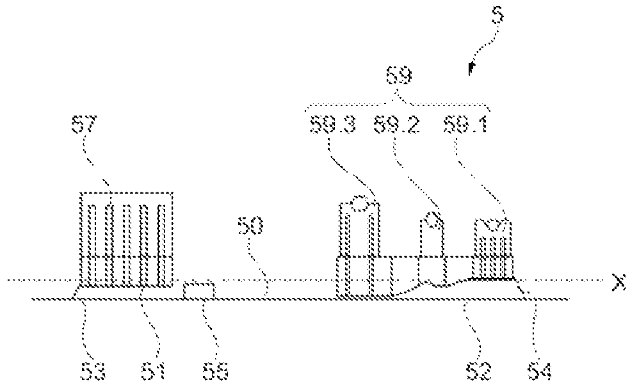

The front of the two-channel connector 100, as finally assembled, is shown in FIG. 8. The connector 100 obtained therefore has individual electromagnetic shielding for each unitary contact 9.1, 9.2 and overall fluid sealtightness at the level of the housing 90.

Different variants may be envisaged for the ties 53, 54 for the front and rear crimping portions 51, 52, respectively, of the one-piece blank 5 according to the first alternative of the invention.

It is further possible to envisage a pair of additional crimping wings 59.3 to be crimped to the rear of the insulator of the component.

The crimping portions 51, 52 are raised with respect to the plane of the support frame 50. This allows the cable to be inserted without the support frame 50 getting in the way.

Figure 10:
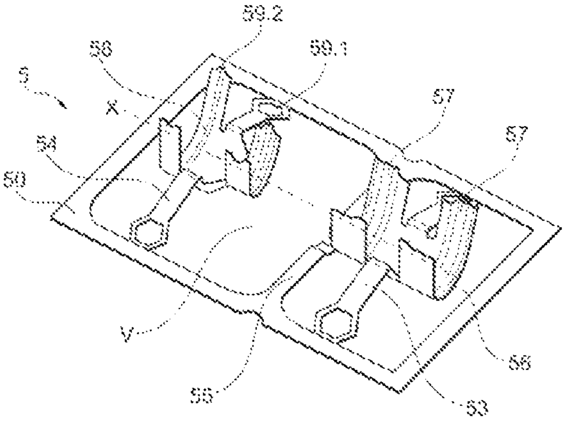
FIG. 10 is a perspective view of a second variant embodiment of a one-piece blank for assembly by crimping according to the first alternative of the invention.

Conversely, it is possible to envisage only ties 53, 54, preferably in pairs, for each of the portions 51, 52 which extend transverse to the longitudinal axis X (FIG. 10). These lateral ties 53, 54 allow the crimping portions 51, 52 to be held with better stability.

Figure 11:
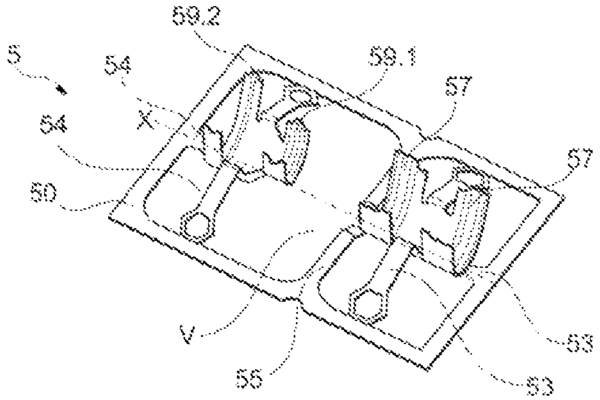
FIG. 11 is a perspective view of a third variant embodiment of a one-piece blank for assembly by crimping according to the first alternative of the invention.

It is also possible to combine longitudinal and lateral ties 53, 54 (FIG. 11).

FIGS. 12A to 12G show the various steps in one alternative method for assembling a two-channel connector 100 incorporating two cable-connected unitary contacts obtained from a sub-assembly according to the first alternative of the invention.

Figure 12A:
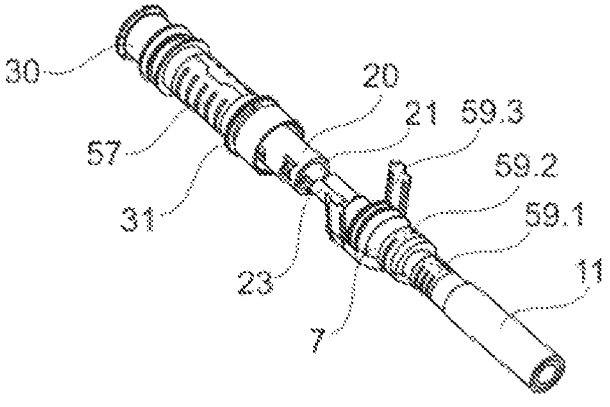
FIGS. 12A, 12B, 12C, 12D, 12E, 12F, 12G, 12H are perspective views showing the various steps in one alternative method for assembling a two-channel connector incorporating two shielded and cable-connected unitary contacts obtained from a sub-assembly according to the first alternative of the invention.
Figure 12B:
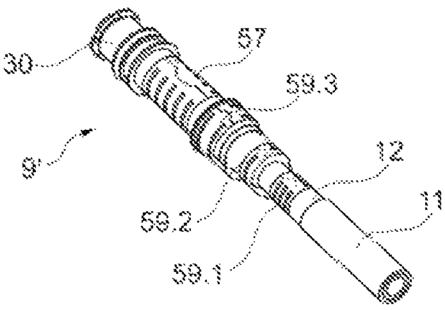
Figure 12C:
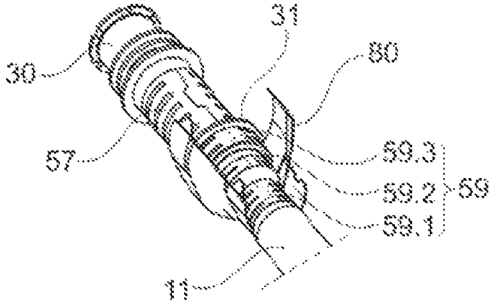
Figure 12D:
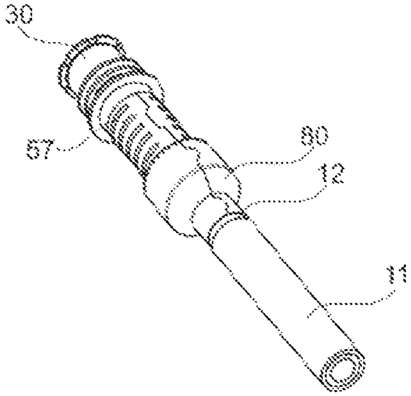
Figure 12E:
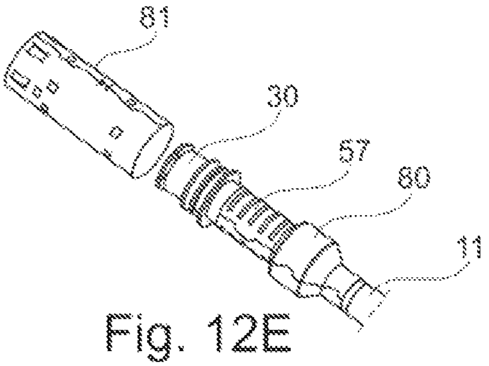
Figure 12F:
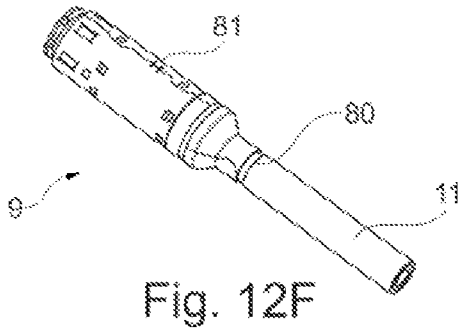

Steps i1/ to v1/ are not described here, these being the same as those described previously with the exception that the seal 7 is fitted around the inner sheath 13 between the shielding braid and the crimping region of the central contact, a pair of crimping wings 59.2 then being folded beforehand around the seal 7 (FIGS. 12A, 12B). A unitary contact 9' is thus obtained. Upon completion of this step, the unitary contact 9' is not shielded.

Step vii'1/: At least one shielding envelope 80 that surrounds the rear portion 52 with the wings 59.1, 59.2, 59.3 crimped is then mounted (FIGS. 12C, 12D), and then a shielding envelope 81 that surrounds both the electrically insulating part 3 and the crimped front portion 51 is mounted (FIGS. 12E, 12F), so as to obtain a shielded unitary contact 9.

Figure 12G:
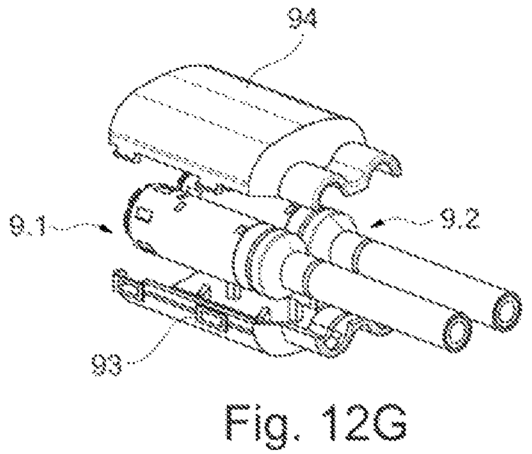

Step viii'1/: Next, two interface housing half-shells 93, 94 are mounted around two shielded unitary contacts 9.1, 9.2 according to step vii'1/ (FIG. 12G).

Figure 12H:
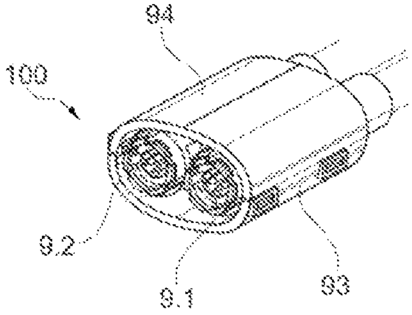

The connector 100 obtained according to this alternative embodiment and shown in FIG. 12H therefore has individual electromagnetic shielding for each unitary contact 9.1, 9.2 and also individual fluid sealtightness for each unitary contact 9.1, 9.2. The electromagnetic shielding of this connector may be of higher performance than that obtained with unitary contacts 9 shown in FIG. 6F.

Figure 13:
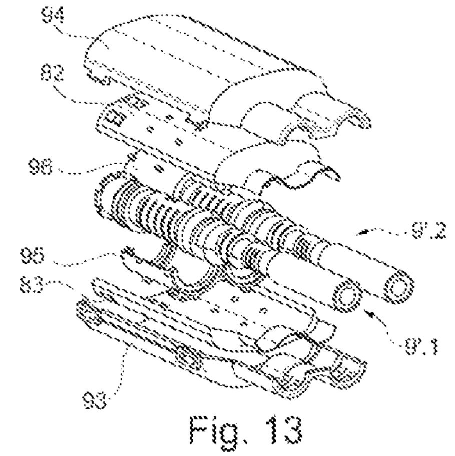
FIG. 13 is a perspective view showing a step in another alternative method for assembling a two-channel connector incorporating two cable-connected unitary contacts obtained from a sub-assembly according to the first alternative of the invention.

FIG. 13 shows one alternative embodiment of a connector 100 based on unshielded unitary contacts 9'1, 9'2 like that 9' illustrated in FIG. 12B, obtained from a sub-assembly according to the first alternative of the invention.

Steps i1/ to v1/ are not described here, these being the same as those described previously with the exception that the seal 7 is fitted around the inner sheath 13, a pair of crimping wings 59.2 then being folded beforehand around the seal 7 (FIGS. 12A and 12B).

Step vi"1/: The central contact crimped around the one or more conductive wires is fitted into the electrically insulating part 3, joining them together definitively, and the wings 59.3 are crimped onto the insulator 3 to hold the assembly together.

Step vii"1/: Two shielding half-shells 82, 83 are mounted which cover both the electrically insulating part 3 and the front crimping portion 51 and the crimped wings 59.3, 59.2 and 59.1 (FIG. 13).

Step viii"1/: Two interface housing half-shells 93, 94 are mounted around the unshielded contacts 9'1, 9'2 according to step vii"1/.

In this embodiment, two support half-shells 95, 96 may be inserted, each being inserted between the two unitary contacts 9'1, 9'2 and a shielding half-shell 82, 83 (FIG. 13) for support and to absorb the forces that may be exerted on the sub-assemblies 9.

The connector 100 obtained according to this other alternative embodiment therefore has overall electromagnetic shielding for the two unitary contacts 9'1, 9'2 and individual fluid sealtightness for each unitary contact 9'1, 9'2.

Figure 14:
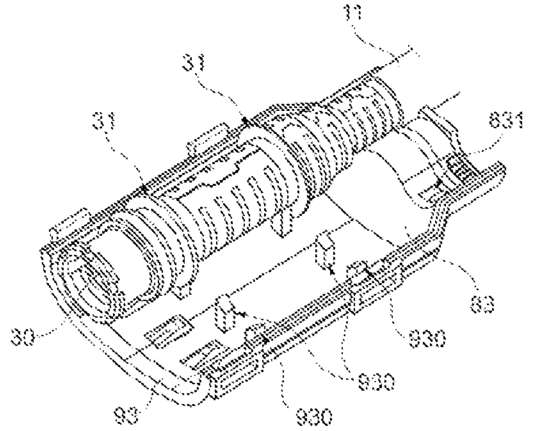
FIG. 14 is a view of one variant embodiment of a housing for a two-channel connector according to the first alternative of the invention.

FIG. 14 shows one variant embodiment of a two-channel connector housing.

Protruding projections 930 may be incorporated inside the housing to support the front of the sub-assembly 9', typically bearing against the crimped wings 57 or hollow 56. These positioning projections replace the support half-shells 95, 96.

One or more metal projections 831 may also be incorporated into the shieldings 82 and 83 to ensure electrical continuity with the one or more shieldings of the one or more contacts 9'1, 9'2.

While in the preceding figures the metal one-piece blank 5 according to the first alternative of the invention is produced by means of a die-cutting technique, preferably rolled off a continuous strip and then joined by crimping to the sub-assembly consisting of a central contact 2 pre-assembled in an electrically insulating part 3, it is also possible to envisage other techniques for producing a connector sub-assembly.

Figure 15A:
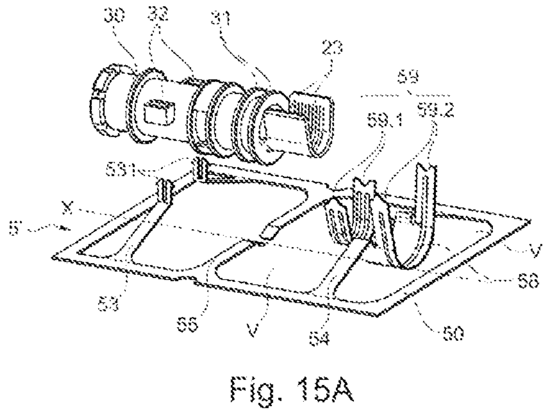
FIGS. 15A and 15B are perspective views of one variant embodiment of a connector sub-assembly according to the first alternative of the invention by clip-fastening of a one-piece blank to an electrically insulating part housing a pre-assembled central contact.
Figure 15B:
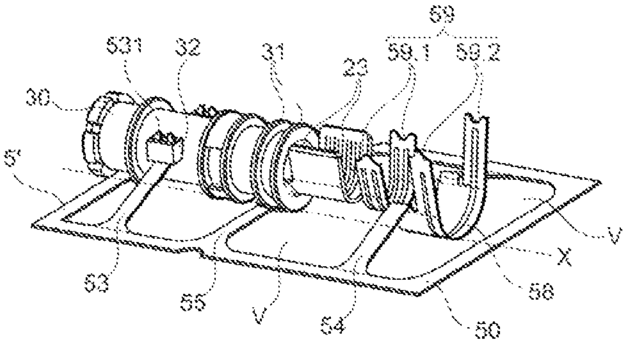

For example, it is possible to envisage assembly of a metal one-piece blank 5' by clip-fastening the electrically insulating part 3 housing the pre-assembled central contact 2 into the planar support 50 (FIGS. 15A, 15B). To do this, the ties 53 of the front portion 51 are each provided at their free end with a flexible hook 531 which snaps into an eye 32 protruding from the periphery of the electrically insulating portion 30.

Figure 16A:
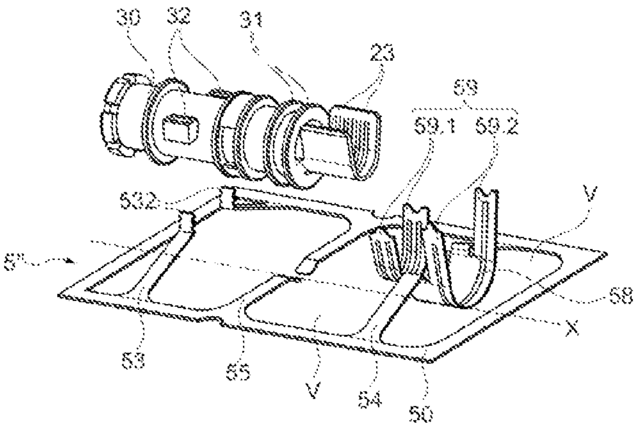
FIGS. 16A and 16B are perspective views of one variant embodiment of a connector sub-assembly according to the first alternative of the invention by force-fitting by catching of a one-piece blank to an electrically insulating part housing a pre-assembled central contact.
Figure 16B:
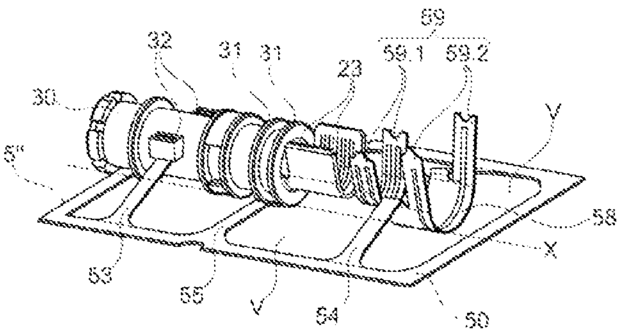

Alternatively, it is possible to envisage assembly of a metal one-piece blank 5' by force-fitting by catching of the electrically insulating part 3 housing the pre-assembled central contact 2 into the planar support 50 (FIGS. 16A, 16B). To do this, the ties 53 of the front portion 51 are each provided at their free end with a catch 532 which is caught in an eye 32 protruding from the periphery of the electrically insulating portion 30.

Figure 17A:
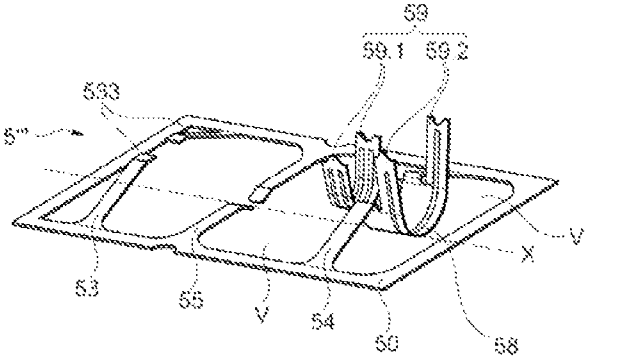
FIGS. 17A and 17B are perspective views of one variant embodiment of a connector sub-assembly according to the first alternative of the invention by overmolding of an electrically insulating part.
Figure 17B:
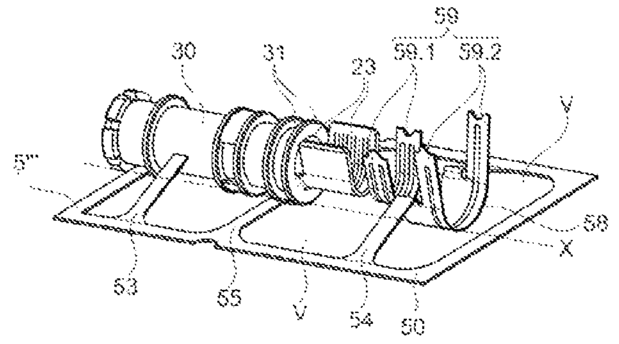

Alternatively, it is possible to envisage assembly of a metal one-piece blank 5''' by overmolding of the electrically insulating part 3 housing the pre-assembled central contact 2 onto the planar support 50 (FIGS. 17A, 17B). To do this, the ties 53 of the front portion 51 are each provided at their free end with an overmolding support 533 over which the periphery of the electrically insulating portion 30 is overmolded.

The various steps in the assembly of a pre-assembled connector sub-assembly according to a second alternative of the invention will now be described with reference to FIGS. 18A to 18F.

Figure 18A:
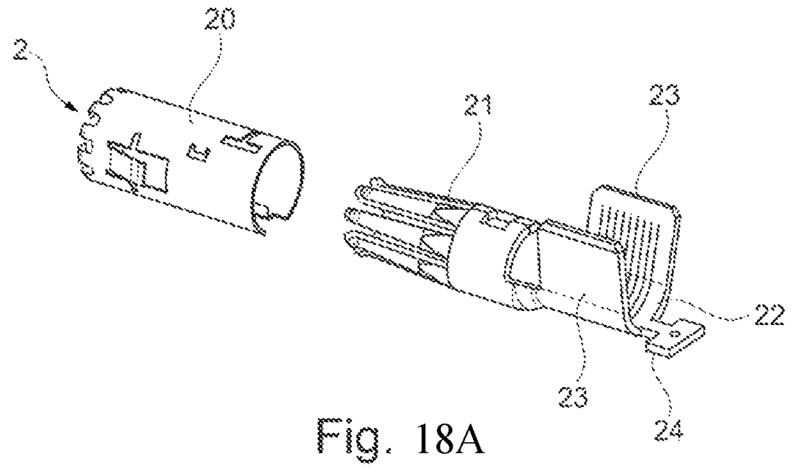
FIGS. 18A, 18B, 18C, 18D, 18E, 18F are perspective views showing different steps in the assembly of a pre-assembled connector sub-assembly according to the second alternative of the invention.
Figure 18B:
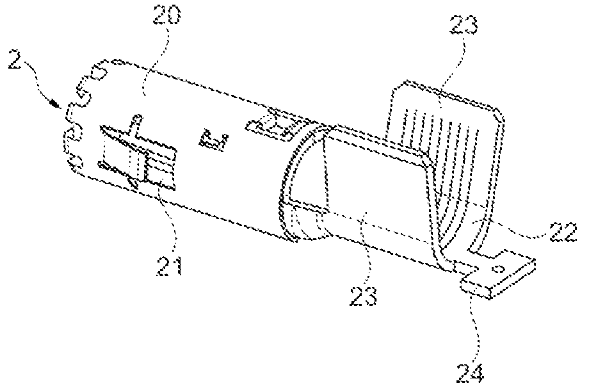

Step 1/: A central contact 2 is pre-assembled. To do this, a portion forming a petalled sleeve 21, made of electrically insulating material, is fitted into and crimped to an electrically conductive cylindrical body 20 (FIGS. 18A, 18B). The crimping operation may be replaced with a snap-fitting operation.

The sleeve 21 is extended at the rear by a front crimping portion that takes the overall shape of a U comprising an accommodating hollow 22 and two crimping wings 23 that are connected to the hollow 22, and are preferably symmetrical on each side of the hollow. These crimping wings 23 are intended to accommodate and to be crimped around the one or more conductors 10 of the cable 1.

An outgrowth of material 24 is provided in the rear continuation of the accommodating hollow 22. This outgrowth of material 24 forms an assembly joining portion, as described in detail hereinafter.

Figure 18C:
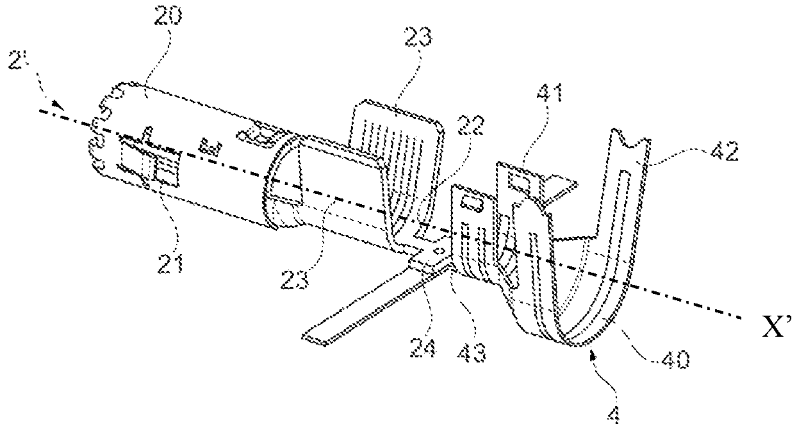

Step 2/: A metal crimping rear portion 4 is provided for assembly with the central contact sub-assembly 2 (FIG. 18C).

This crimping portion 4 is produced by means of a die-cutting technique, preferably rolled off a continuous strip. Advantageously, the material and/or the thickness of this crimping rear portion 4 is different from that of the sleeve 21.

This rear crimping portion 4 comprising an accommodating hollow 40 and at least one crimping wing 41 connected to the hollow 40 and designed to be crimped around the shielding braid 12 of the insulated cable 1.

The rear crimping portion 4 also comprises at least one crimping wing 42 designed to be crimped around a seal 7. In the event that no sealing is required, the seal is not needed and the crimping wing 42 is directly crimped around the outer sheath of the cable.

Preferably, the rear crimping portion 4 is continuous in order to ensure the electrical ground continuity.

This crimping rear portion 4 further comprises an outgrowth of material 43 provided in the front continuation of the accommodating hollow 40.

Step 3/: The rear crimping portion 4 is positioned facing the front crimping portion 22, 23 formed in the sleeve 21 (FIG. 18C). More precisely, they are positioned such that the two outgrowths of material 24, 43 are in contact with one another.

These outgrowths 24, 43 are then welded together in order to produce the assembly.

They may also be joined using a riveting, clinching, brazing or bonding technique between the two outgrowths 24, 43 which may be adapted depending on the technique used.

A sub-assembly 2' is thus obtained here.

Figure 18D:
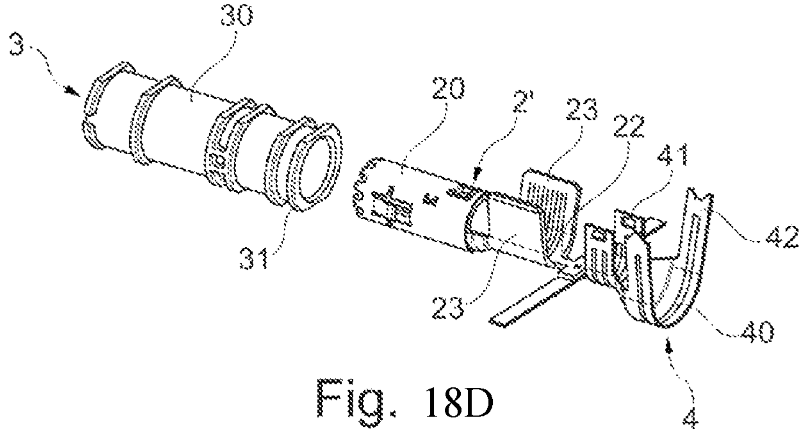
Figure 18E:
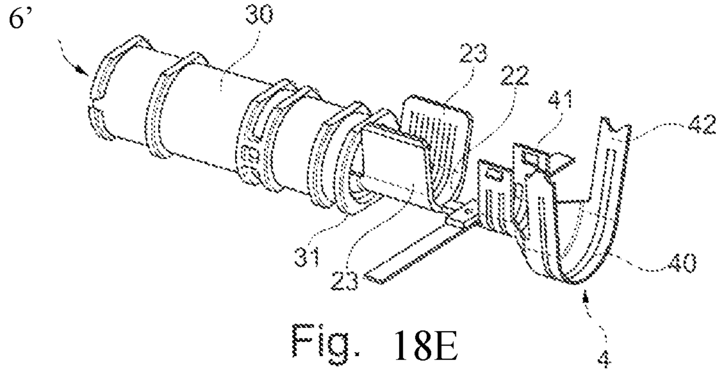
Figure 18F:
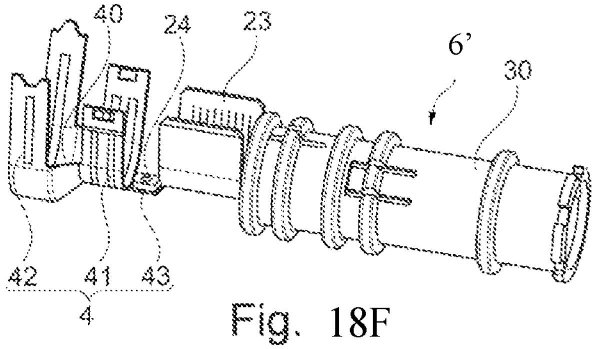

Step 4/: The central contact 2 of the sub-assembly 2' is then fitted into and secured to an electrically insulating part 3 (FIG. 18D). More precisely, this assembly is carried out so that the cylindrical body 20 is completely housed and secured inside an electrically insulating cylindrical body 30 and the crimping portion 22, 23 which protrudes from the rear of the insulating body 30 is delimited by a cylindrical bearing segment 31, as described in detail hereinafter (FIG. 18E).

This step 4/ of adding an electrically insulating part is optional. It may also take place after step 1/ or step 2/.

A pre-assembled connector sub-assembly 6' is then ready.

Figure 19:
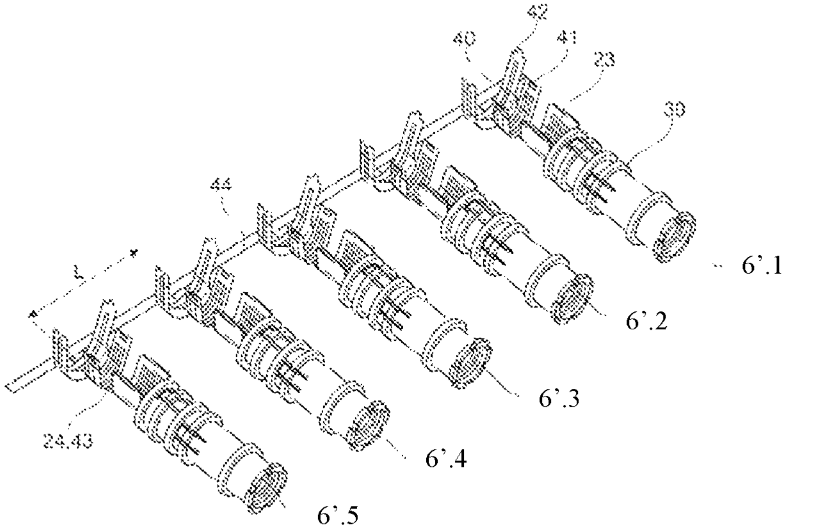
FIG. 19 is a perspective view of a plurality of adjacent connector sub-assemblies obtained according to FIGS. 18A to 18F, ready to be joined to a shielded and insulated cable.
Figure 20:
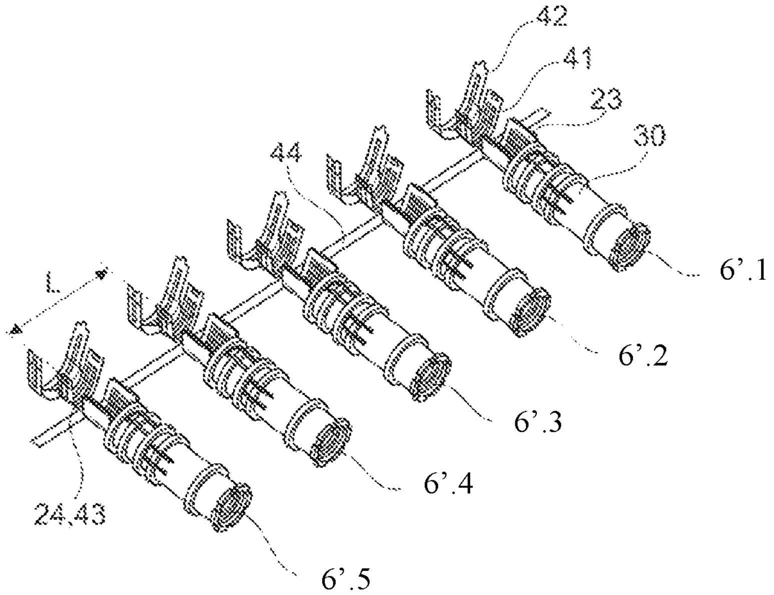
FIG. 20 is a perspective view showing one variant embodiment of FIG. 19.

To facilitate automation and assembly in a continuous process, it is possible to produce a continuous carrier strip 44 of a plurality of unitary sub-assemblies 2'1 to 2'5 or 6'1 to 6'5 which are adjacent and therefore joined together mechanically by this carrier strip 44 (FIGS. 19, 20).

The width L, which defines the spacing between two adjacent sub-assemblies 6' or 2', may be adjusted as needed. By decreasing it, the density of sub-assemblies on the reel, i.e. the number of sub-assemblies that one same reel 61 can hold, is increased.

Multiple positions for the carrier strip 44, also called the edge strip, are possible.

For example, as shown in FIG. 19, the carrier strip 44 may be arranged on the outside of each unitary sub-assembly 6', secured to the rear crimping portion 4.

It is also possible to arrange it between the front 22, 23 and rear crimping portions 4, preferably at the level of the assembly joint between the outgrowths of material 24, 43 (FIG. 20).

It may also be secured to the front crimping portion 22, 23. It is also possible to secure it to an element outside of the front and rear crimping portions.

To move the carrier strip 44 along during assembly in a continuous process, at least one guide or driving hole 45 for guiding or driving this strip is provided. Preferably, there is at least one guide hole 45 facing each sub-assembly 5. These guide holes 45 have multiple functions, including:

- allowing the strip 44 to be moved along with a high degree of precision;
- allowing, in subsequent cutting or rolling steps, the sub-assembly 2' or 6' to be positioned on the rolling or cutting tools;
- allowing, in an operation of assembly between two strips 44, the strips to be guided and moved along and positioned;
- allowing the strip 44 to be driven and then held and positioned during a crimping operation;
- facilitating winding onto a reel.

Figure 21:
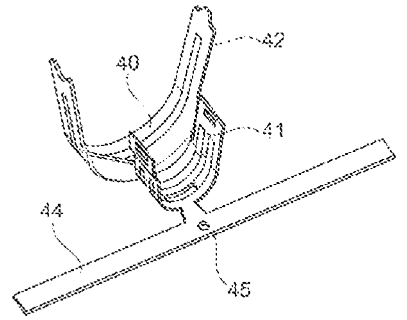
FIG. 21 is a perspective view showing the carrier strip linking the crimping ends of a plurality of adjacent connector sub-assemblies as according to FIG. 19 or 20.

As shown in FIG. 21 with respect to the variant in which the carrier strip 44 is secured to the rear crimping portion 4, on the outside of the sub-assembly 5, a driving hole 45 is pierced directly facing the hollow 40.

Figure 22:
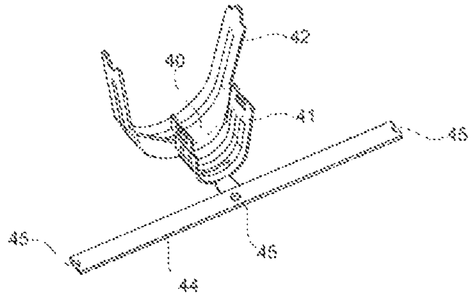
FIG. 22 is a perspective view showing one variant embodiment of FIG. 21.

Additional holes 45 may be pierced at other locations in the carrier strip 44 (FIG. 22).

Figure 23:
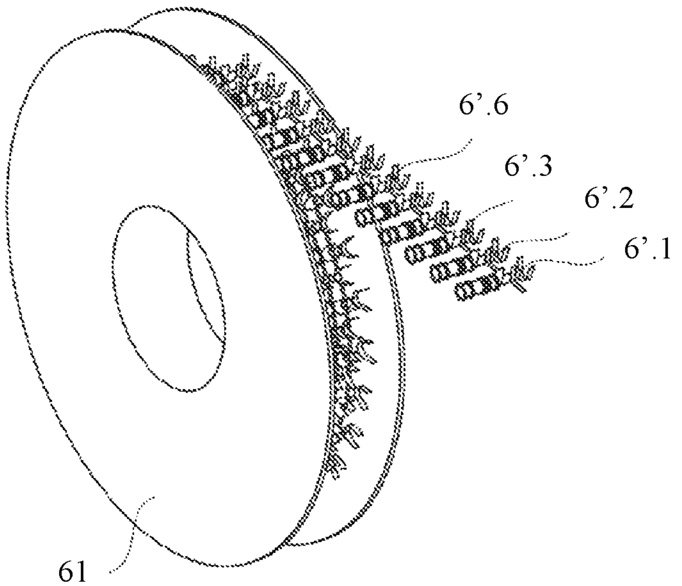
FIG. 23 is a perspective view of one example of a reel of the second alternative of the invention comprising a plurality of kits ready to be used on an assembly line for joining to a cable.

To further optimize assembly, for compactness, to facilitate storage and transport, the continuous strip may take the form of a continuous reel 61 wound around a spool (FIG. 23). This reel 61 may be entirely produced in an independent assembly unit with respect to an assembly unit for joining to a cable 1.

Figure 24A:
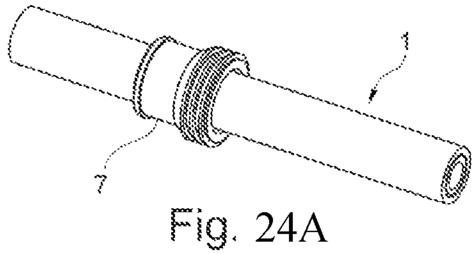
FIGS. 24A, 24B, 24C are perspective views showing the various steps in the preparation of a shielded and insulated cable before it is joined by crimping to a pre-assembled connector sub-assembly according to the second alternative of the invention.
Figure 24B:
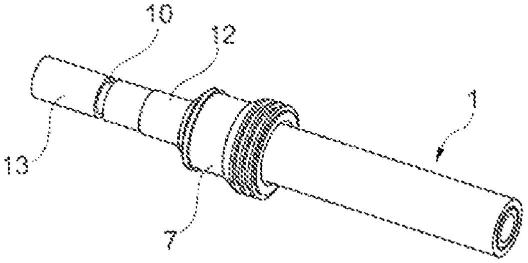
Figure 24C:
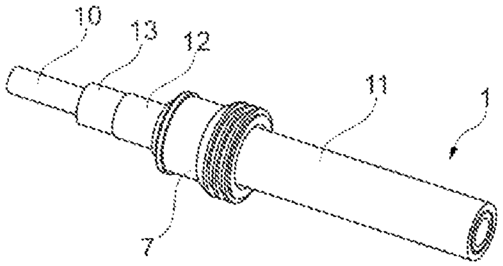

The various steps in preparing a shielded and insulated cable 1 according to the invention will now be described with reference to FIGS. 24A to 24C.

Step 1/: A seal 7 is fitted around the outer sheath 11 of the cable 1 (FIG. 24A) to avoid any potential damage to the metal braid 12, the one or more conductors 10 or the seal 7 itself.

Step 2/: The outer sheath 11 and the inner sheath 13 are pre-stripped to reveal the one or more conductors 10 and the metal braid 12, respectively, over a predetermined length (FIG. 24B). Alternatively, step 2/ may be carried out before step 1/.

Step 3/: The stripped portion of the inner sheath 13 of the cable 1 is removed (FIG. 24C). The various steps in the joining of a pre-assembled sub-assembly 2' or 6' to an insulated and shielded cable in order to obtain a cable-connected unitary contact 9 will now be described with reference to FIGS. 25A to 25H.

Step i2/: A cable 1 prepared according to FIGS. 24A to 24C is provided.

Step ii2/: A pre-assembled sub-assembly 2' or 6' secured to the reel 61 by the carrier strip 44 is provided, which is placed on a crimping support S.

Figure 25A:
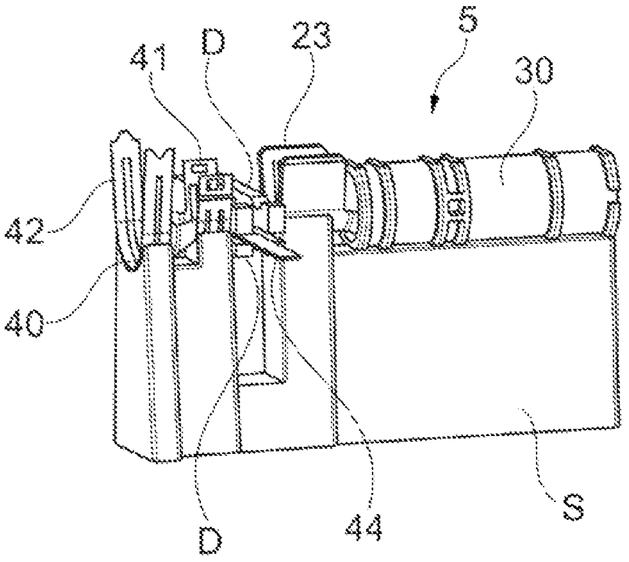
FIGS. 25A, 25B, 25C, 25D, 25E are perspective views showing the various steps in the joining of a pre-assembled connector sub-assembly according to the second alternative of the invention to a shielded and insulated cable prepared according to FIGS. 24A to 24C, in order to obtain a shielded and cable-connected unitary contact.

The crimping support S supports at least the hollow 22 and 40 of the front and rear crimping portions and preferably also the electrically insulating cylindrical body 30 (FIG. 25A). This crimping support S advantageously features cylindrical portions which snugly fit the hollows 22, 40 of the front and rear crimping portions of the pre-assembled sub-assembly 2' or 5, respectively.

A mechanical cutting tool D for cutting the carrier strip 44 is positioned around same (FIG. 25A).

Figure 25B:
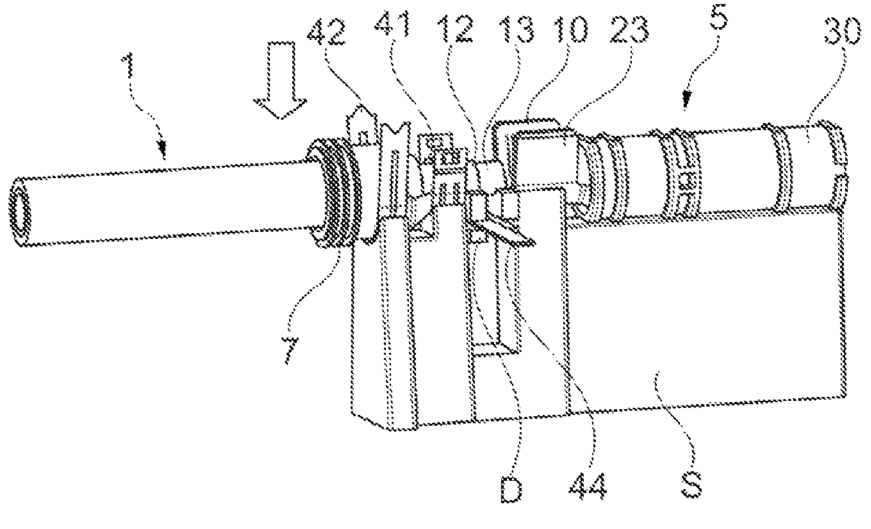
Figure 25C:
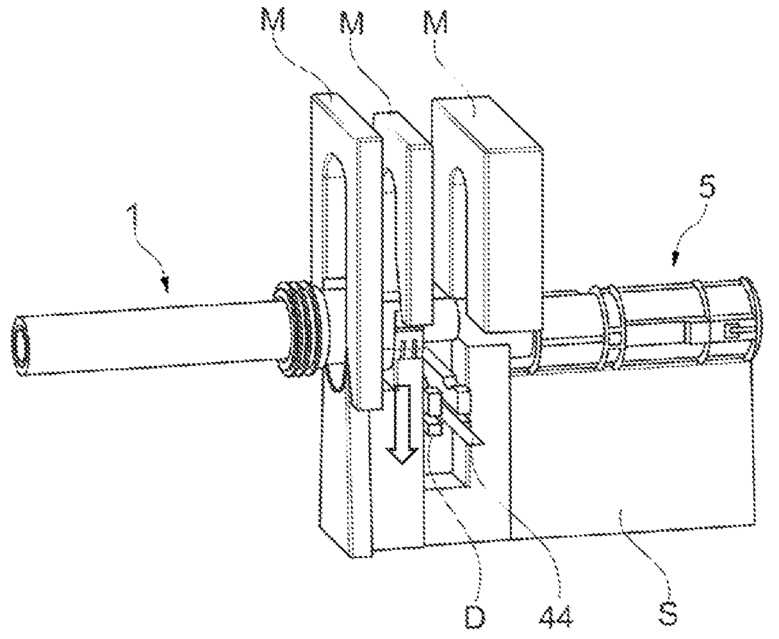

Step iii2/: The cable 1 equipped with the seal 7 is positioned in the sub-assembly 2' or 6' such that the exposed portion 10 of the one or more conductive wires 1 is accommodated in the front crimping portion 22, 23 of the pre-assembled central contact 2' or 6' and that the exposed portion of the shielding braid 12 and the seal 7 are accommodated in the hollow 40 of rear crimping portion 4 of the sub-assembly 2' or 6' (FIG. 25B).

Step iii'2/: The jaws M are brought as close as possible to, preferably in contact with, the crimping wings 23, 41, 42 in order to prevent them from rotating when the carrier strip is cut. Next, the carrier strip 44 is cut which is done by shearing the cutting tool D downward (arrow of FIG. 25C), once the cable has been positioned.

Figure 25D:
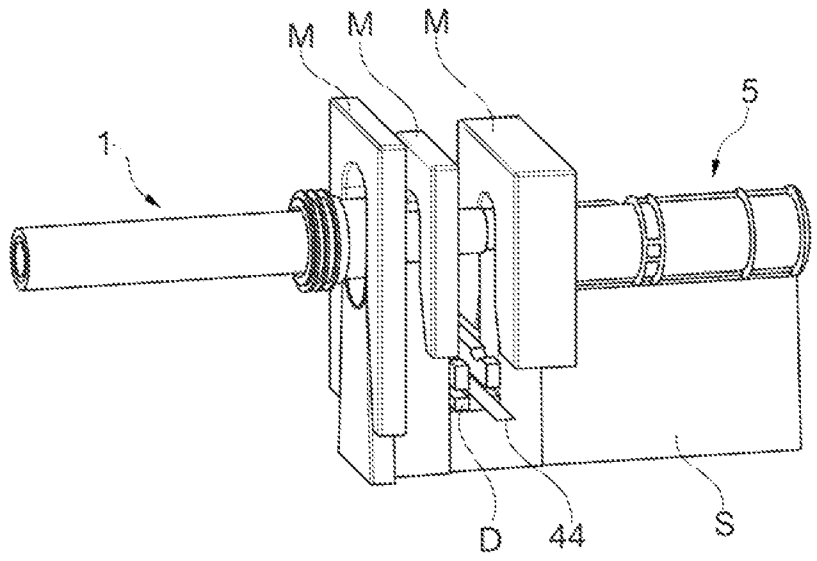

Step iv2/: Next, by means of a jaw-anvil crimping tool (M/S), the front crimping portion 22, 23 of the pre-assembled central contact is crimped onto the one or more conductive wires 10 and the rear crimping portion 4 of the sub-assembly is crimped onto the shielding braid 12 and onto the seal 7 (FIG. 25D).

Thus, the jaws M simultaneously fold the pair of crimping wings 23 around the one or more conductors 10 and each of the two pairs of crimping wings 41 and 42 around the metal shielding braid 12 and the seal 7, respectively. The crimping jaws M are advantageously sized so as to be robust and therefore to crimp cables 1 of large cross section, in particular power cables.

Figure 25E:
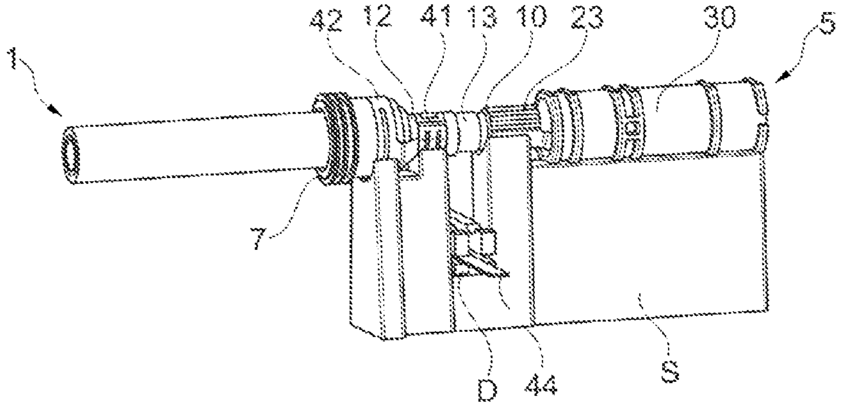
Figure 25F:
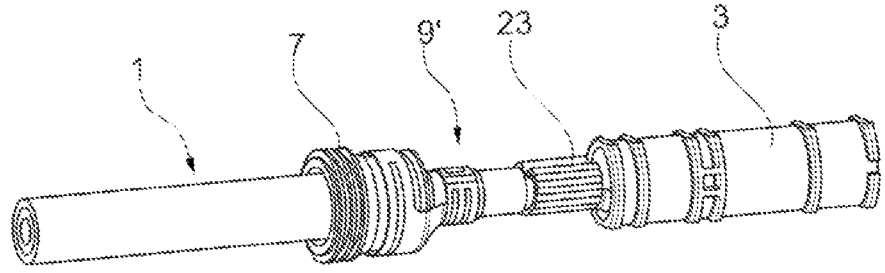
FIGS. 25F and 25G are perspective views of a pre-assembled connector sub-assembly according to the second alternative of the invention, crimped onto the cable and partially or completely inserted into the insulator.

Once crimping has been carried out, the crimping jaws M are withdrawn and the unitary contact 9' crimped onto the cable then just has to be removed from the crimping support S (FIGS. 25E, 25F).

Figure 25G:
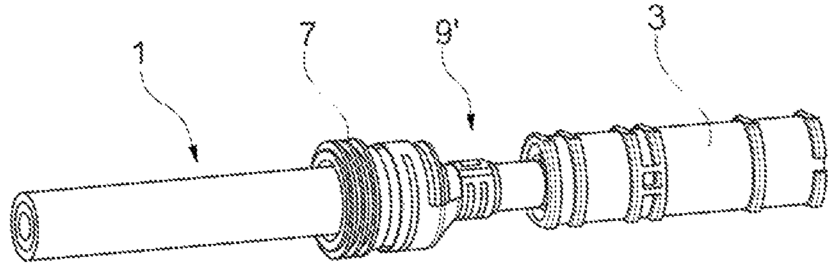

Step v2/: To finish the cable-connected unitary contact 9', the electrically insulating part 3 is pushed into its final position of use (FIG. 25G).

Figure 25H:
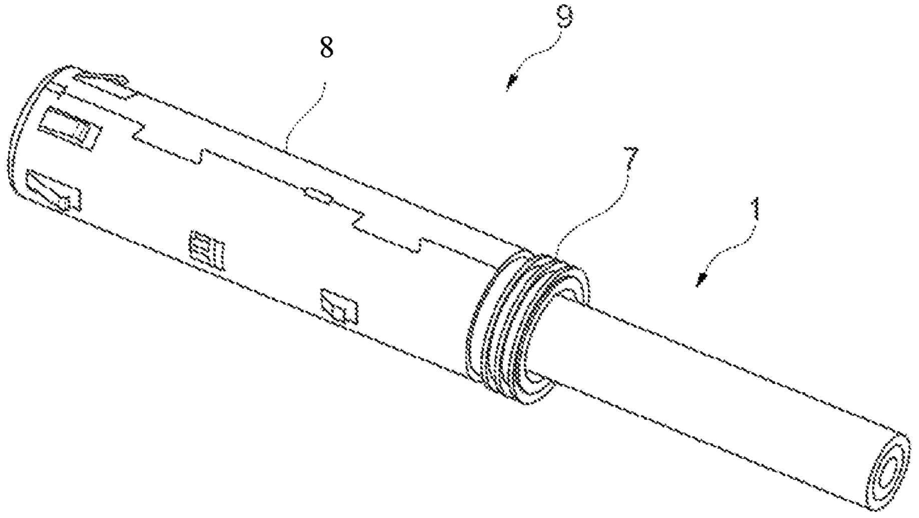
FIG. 25H is a perspective view of a shielded, cable-connected unitary contact according to the second alternative of the invention.

Step vi2/: At least one shielding envelope 8 that surrounds both the electrically insulating part 3 and the crimped portions is mounted so as to obtain a shielded unitary contact 9 (FIG. 25H).

On the basis of this shielded unitary contact 9, it is possible to produce multichannel connectors like according to the variants described with reference to FIGS. 12G and 12H or FIGS. 13 and 14.

Other variants and improvements may be made without however departing from the scope of the invention.

In the illustrated examples of the invention, the central contact 2 is of female type and is produced from two distinct parts 20 and 21. It is possible to envisage producing a central contact of male type and a central contact as just one part.

The invention claimed is:

1. A one-piece metal blank for joining a connector to a cable by crimping, comprising:

a peripheral rim forming a support which extends along a longitudinal axis;

at least two aligned portions, each extending along the longitudinal axis while being separated from one another, each of the at least two aligned portions being held to the support by at least one strip forming a tie, a front portion being a crimping portion, a clip-fastening portion, a force-fitting-by-catching portion or an overmolding portion, designed to accommodate and to hold by crimping, clip-fastening, force-fitting by catching or overmolding, respectively, an electrical component of the connector, while a rear portion, which is continuous, is a portion for crimping the cable, comprising openings for allowing crimping jaws to pass through.

2. The one-piece blank according to claim 1, wherein the front portion is a crimping portion.

3. The one-piece blank according to claim 2, wherein each of the two crimping portions comprises an accommodating hollow and at least one crimping wing connected to the hollow, one of the hollows being intended to accommodate the electrical component of the connector.

4. The one-piece blank according to claim 3, wherein the front crimping portion comprises at least one crimping wing designed to be crimped around the electrical component.

5. The one-piece blank according to claim 2, wherein the rear crimping portion comprises at least one crimping wing designed to be crimped around the shielding braid of the insulated cable and/or around the outer and/or inner insulating sheath of the insulated cable or around a seal fitted around the outer sheath of the insulated cable.

6. The one-piece blank according to claim 1, wherein each of the two portions is held to the support by at least one tie which extends along the longitudinal axis and/or laterally thereto.

7. A connector sub-assembly, comprising:

an electrical component comprising a pre-assembled central contact, and at least one crimping portion, a one-piece blank according to claim 1.

8. The connector according to claim 7, one of the two portions of the one-piece blank accommodates the electrical component.

9. A reel for automatically or semi-automatically joining a connector to a cable by crimping, comprising a plurality of connector sub-assemblies according to claim 7, joined together by an edge of the supports of the blanks and wound around a spool.

10. A method for joining at least one connector to a cable, comprising the following steps:

i1/providing a shielded and insulated cable, the one or more conductive wires and the shielding braid being exposed at one end of the cable;

ii1/providing a connector sub-assembly according to claim 7;

iii1/positioning the cable in the connector sub-assembly such that the exposed portion of the one or more conductive wires is accommodated in the crimping portion of the pre-assembled central contact and that the exposed portion of the shielding braid is accommodated in the rear crimping portion of the sub-assembly which is separated from the central contact;

iv1/crimping, by means of a jaw-anvil crimping tool, inserted into the openings between the support and the one or more ties of the crimping portion of the pre-assembled central contact onto the one or more conductive wires of the rear crimping portion of the sub-assembly onto the shielding braid;

v1/cutting the one or more ties so as to obtain a unitary contact pre-assembled with the cable.

11. The method according to claim 10, step i1/further comprising the provision of a seal fitted around the outer or inner sheath of the cable.

12. Method according to claim 10, comprising, after cutting step v1/, the following step:

vi1/fitting the central contact crimped around the one or more conductive wires into the electrically insulating part, thereby joining them together definitively.

13. Method according to claim 12, comprising, after step vi1/, when the seal is fitted around the outer sheath of the cable, the following steps:

vii1/mounting, by snap-fitting, at least one shielding envelope that surrounds both the electrically insulating part and the front portion, so as to obtain a shielded unitary contact;

viii1/fitting at least one cable-connected unitary contact, shielded according to step vii/, into a one-piece connector housing.

14. A cable-connected unitary contact obtained using the method according to claim 13.

15. The cable-connected unitary contact of claim 14, wherein the cable-connected unitary contact is shielded.

16. The method according to claim 12, comprising, after step vi1/, when the seal is fitted around the inner sheath of the cable, the following steps:

vii'1/mounting at least one shielding envelope that surrounds the crimped rear portion, and a shielding envelope that surrounds both the electrically insulating part and the front portion, so as to obtain a shielded unitary contact;

viii'1/mounting two interface housing half-shells around the one or more unitary contacts shielded according to step vii"/.

17. A connector obtained using the method according to claim 10.

18. The connector sub-assembly according to claim 7, wherein the pre-assembled central contact is housed in an electrically insulated part.

19. A pre-assembled sub-assembly, which is electrically conductive and extends along a longitudinal axis, to be joined by crimping to a cable comprising an electrically conductive core and at least one electrically insulating sheath, the pre-assembled sub-assembly comprising a central contact and comprising at least two, electrically conductive, crimping portions, in the axial continuation of the cylindrical body, the portion of which closest to the body, called the front portion, is designed to be crimped around the core of the cable, while the portion of which furthest from the body, called the rear portion, is designed to be crimped around the insulating sheath, the front and rear crimping portions being of different constituent materials and/or thicknesses.

20. The pre-assembled sub-assembly according to claim 19, wherein each of the two crimping portions comprises at least one accommodating hollow and at least one crimping wing connected to the hollow, the hollow of the front crimping portion being intended to accommodate the core of the cable while the hollow of the rear crimping portion is intended to accommodate the insulating sheath and/or the braid of the cable.

21. A pre-assembled connector sub-assembly, comprising a pre-assembled sub-assembly according to claim 19 and an electrically insulating part in which the sub-assembly is at least partially housed.

22. A reel for automatically or semi-automatically joining a pre-assembled sub-assembly to an insulated cable by crimping, comprising a plurality of pre-assembled sub-assemblies according to claim 15, which are mechanically linked to one another by at least one carrier strip.

23. A method for joining at least one pre-assembled sub-assembly to a cable, comprising the following steps:

i2/providing a shielded and insulated cable, the one or more electrically conductive wires forming the core and the shielding braid being exposed at one end of the cable;

ii2/providing a pre-assembled sub-assembly according to claim 19;

iii2/positioning the cable in the pre-assembled sub-assembly such that the exposed portion of the one or more conductive wires is accommodated in the front crimping portion of the central contact and that the exposed portion of the shielding braid is accommodated in the rear portion of the central contact;

iv2/crimping the front crimping portion of the pre-assembled central contact onto the one or more conductive wires and the rear crimping portion of the pre-assembled central contact onto the shielding braid, so as to obtain a unitary contact pre-assembled with the cable.

24. The pre-assembled sub-assembly according to claim 19, wherein the cable comprises a shielding braid around the core and the rear portion is designed to be crimped around the shielding braid.

* * * * *